(12) United States Patent
Weaver et al.

(10) Patent No.: US 7,289,021 B2
(45) Date of Patent: Oct. 30, 2007

(54) APPARATUS AND METHOD FOR ATTACHING AN ANNULAR TRANSPONDER UNIT TO TIRE

(75) Inventors: Douglas Raymond Weaver, Uniontown, OH (US); Joseph Carmine Lettieri, Stow, OH (US); Gary Edwin Tubb, Copley, OH (US); Dwayne Richard Huston, Fairlawn, OH (US); James Michael Hart, Akron, OH (US); William Allen Rex, Doylestown, OH (US); Robert Allen Birch, Mantua, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 565 days.

(21) Appl. No.: 10/917,754

(22) Filed: Aug. 13, 2004

(65) Prior Publication Data
US 2006/0032563 A1 Feb. 16, 2006

(51) Int. Cl.
*B60C 23/00* (2006.01)
(52) U.S. Cl. .................. 340/442; 340/443; 340/444; 340/445; 340/446; 340/447; 340/539.1; 73/146.2
(58) Field of Classification Search ............. 340/442, 340/443, 444, 445, 446, 447, 539.1; 73/146.2, 73/146.8
See application file for complete search history.

(56) References Cited
U.S. PATENT DOCUMENTS
6,892,776 B2* 5/2005 Skoff .................. 152/342.1

6,912,897 B2* 7/2005 Luce ...................... 73/146.8
6,941,989 B2* 9/2005 Grotendorst et al. ........ 152/415
6,943,673 B2* 9/2005 Skoff et al. ................. 340/442

* cited by examiner

*Primary Examiner*—Daryl C Pope
(74) *Attorney, Agent, or Firm*—Richard B. O'Planick

(57) ABSTRACT

Apparatus and method in the use thereof attaches an annular transponder unit to an annular tire surface, the transponder unit being of a type having a sensor housing coupled to an annular antenna. The apparatus includes a rotary turntable for supportably rotating a tire having an annular tire surface in an accessible disposition and an arm proximately disposed to the turntable and having end-of-arm tooling for attaching the transponder unit section by section to the annular tire surface as the tire is rotated. The tooling includes a gripping mechanism engaging the sensor housing and placing the sensor housing at a preselected location on the annular tire surface and a guide mechanism engaging the annular antenna and positioning the annular antenna section by section along the annular tire surface as the tire is rotated. An adhesive material applicator nozzle is disposed between the guide mechanism and the gripping means for application of the adhesive material between the annular antenna and the annular tire surface as the tire is rotated. A pre-staging station supporting the transponder unit may further be utilized, the arm moving between the pre-staging station and the turntable and the gripping mechanism engaging the sensor housing at the pre-staging station to transport the transponder unit from the pre-staging station to the turntable.

20 Claims, 19 Drawing Sheets

APPARATUS AND METHOD FOR ATTACHING AN ANNULAR TRANSPONDER UNIT TO TIRE

FIELD OF THE INVENTION

The invention relates generally to apparatus and methods of incorporating a communicating transponder in a tire and, more specifically, to an automated apparatus and method for affixing an annular transponder and antenna unit to an annular tire surface.

BACKGROUND OF THE INVENTION

It is common to employ annular apparatus, including an antenna, for electronically transmitting tire or wheel identification or other data at radio frequency. The apparatus includes a radio-frequency tag, or transponder, comprising an integrated circuit chip having data capacity at least sufficient to retain identification information for the tire or wheel. Other data, such as the inflation pressure of the tire or the temperature of the tire or wheel at the transponder location, can be transmitted by the transponder along with the identification data.

The annular antenna is tire-mounted and transmits, at radio frequencies, data from the transponder to a reader mounted on the wheel assembly. The antenna and transponder may be incorporated into a tire during "pre-cure" manufacture of the tire. The integrity of the connection between the tire and antenna is greatly enhanced by a pre-cure assembly procedure. In practice, however, it is very difficult to do this. Both radial ply and bias ply tires undergo a substantial diametric enlargement during the course of manufacture. Bias ply tires are expanded diametrically when inserted into a curing press, which typically has a bladder that forces the green tire into the toroidal shape of the mold enclosing it. Radial ply tires undergo diametric expansion during the tire building or shaping process and a further diametric expansion during the course of curing. An annular antenna and the electronic tag associated therewith built into the tire in a pre-cure process, therefore, must endure significant strain that can result in component failure. The electronic tag and the connection between the tag and the antenna, in particular, is vulnerable to damage from the forces imposed from pre-cure assembly to tire.

To avoid damaging the electronic tag or the connection between the tag and the annular antenna during the curing procedure, an alternative known approach is to assemble the tag and antenna into a separate annular unit for post-cure attachment to the tire. The annular unit may be attached to the tire after the tire is cured by adhesive or other known techniques. While such an approach avoids damaging the tag electronics during tire manufacture, adhesive attachment of the antenna and tag to a tire in a post-cure procedure has certain drawbacks. First, the procedure is labor intensive, adding cost to the manufacturing process. Secondly, placement of the tag unit on the tire in a manual procedure may be less than accurate through human error, resulting than a less than optimal communication link between the transponder and a remote receiver.

Accordingly, there remains a need for an apparatus and method of attaching an annular transponder unit to a tire that is convenient, cost effective, and reliable. Such a procedure should further ensure the functional safety of the electronics and maintain a secure electrical connection between the antenna and tag electronics. It is further desirable that any such apparatus and method for attaching an annular transponder unit to a tire have minimal labor content in order to reduce human error and the cost of manufacture. Finally, such a procedure ideally would incorporate the advantages, but avoid the shortcomings, of both the pre-cure and post-cure assembly alternatives discussed above.

SUMMARY OF THE INVENTION

Apparatus and method for use thereof attaches an annular transponder unit to an annular tire surface, the transponder unit being of a type having a sensor housing coupled to an annular antenna. In one aspect of the invention, the apparatus includes a rotary turntable for supportably rotating a tire having an annular tire surface in an accessible disposition and an arm proximately disposed to the turntable and having end-of-arm tooling for attaching the transponder unit section by section to the annular tire surface as the tire is rotated. The tooling includes a gripping mechanism engaging the sensor housing and placing the sensor housing at a preselected location on the annular tire surface and a guide mechanism engaging the annular antenna and positioning the annular antenna section by section along the annular tire surface as the tire is rotated. An adhesive material applicator nozzle may be disposed between the guide mechanism and the gripping means for application of the adhesive material between the annular antenna and the annular tire surface as the tire is rotated. In another aspect of the invention, a pre-staging station supporting the transponder unit may further be utilized, the arm moving between the pre-staging station and the turntable and the gripping mechanism engaging the sensor housing at the pre-staging station to transport the transponder unit from the pre-staging station to the turntable.

Pursuant to a further aspect of the invention, a method for attaching the annular transponder unit to the annular tire surface is disclosed and includes the steps:
 a. mounting a tire on a support table, the tire having an annular tire surface accessibly disposed;
 b. positioning an arm proximate to the support table, the arm having tooling means at a remote end;
 c. supporting a section of the transponder unit against the annular tire surface by the arm tooling means;
 d. establishing relative rotation between the arm tooling means and the tire between an initial relative position and a terminal relative position; and
 e. progressively attaching the transponder antenna section by section to the annular tire surface as the tire and arm tooling means relatively rotate.

An additional aspect of the invention method is to establish relative rotation between the arm tooling means and the tire by rotation of the table supporting the tire. A still further aspect of the method includes the steps of gripping the sensor housing by gripping means disposed at the remote end of the arm; holding the sensor housing against an indexed location on the annular tire surface; guiding the annular antenna against the annular tire surface section by section by guide means apparatus disposed at the remote end of the arm; and progressively applying an adhesive material section by section between the annular antenna and the annular tire surface as the tire rotates. A tire made in conformance with the method is a further aspect of the invention.

The invention thus provides for an efficient, reliable, automated, and cost effective apparatus and method for attaching an annular transponder unit to a tire and satisfies the needs of the industry for such a system.

BRIEF DESCRIPTION OF THE DRAWINGS

The invention will be described by way of example and with reference to the accompanying drawings in which.

DETAILED DESCRIPTION OF THE INVENTION

As used herein, a "transponder" is any electronic apparatus (device) capable of monitoring a condition such as air pressure within a pneumatic tire, and then transmitting that information to an external device. The external device can be either an RF (radio frequency) reader/interrogator or, simply an RF receiver. A simple receiver can be used when the transponder is "active", and has its own power source. A reader/interrogator would be used when the transponder is "passive" and is powered by an RF signal from the reader/interrogator. In either case, in conjunction with the external device, the transponder forms a component of an overall tire-condition monitoring/warning system. A "sensor" as used herein is a transponder that senses a tire condition and transmits a reading based thereon. In conventional systems, an antenna is coupled to one or more sensors forming a transponder unit. The antenna may be of various configurations, one of which being an annular body or loop. Together, the antenna and sensor thus comprises an annular transponder unit. For the purpose of the subject disclosure and the invention, the annular transponder unit is not sensor or transponder specific. That is, a wide range of commonly available transponders, sensors, and associated electronics may be packaged and utilized in the practice of the subject invention.

As discussed above, in order to send or receive RF signals, a transponder must have an antenna. The antenna is optimally annular in configuration in the subject invention and is preferably incorporated into the tire by way of a post manufacture procedure. As used herein, an "annular antenna" may be circular, oblong, symmetrical, or asymmetrical without departing from the subject inventive principles. However, the preferred configuration of the antenna is circular and sized to overlap the tire sidewall region to which it attaches. The antenna may comprise a single wire or a plurality of strands. Various commercially available transponders, sensors, and other electrical devices deployed in combination with an annular antenna formed from conventional conductive materials are suitable for use in conformance with the principles of the subject invention.

Acceptable materials for the antenna wire include steel, aluminum, copper or other electrically conducting wire. As disclosed in this patent document, the wire diameter is not generally considered critical for operation as an antenna for a transponder. For durability, stranded steel wire consisting of multiple strands of fine wire is preferred. Other wire options available include ribbon cable, flexible circuits, conductive film, conductive rubber, etc.

Figure 13:
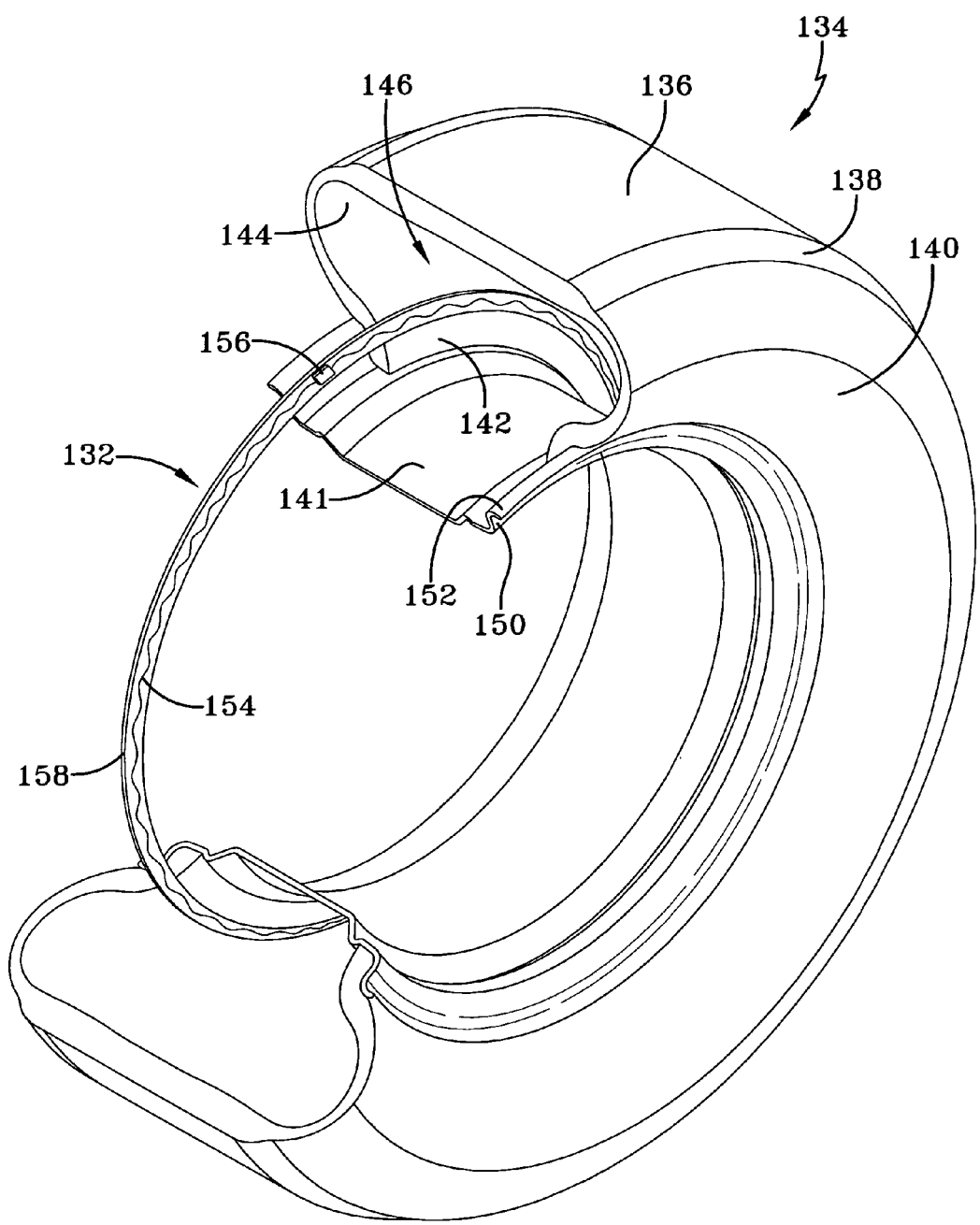
FIG. 13 is a perspective view of a tire shown partially in section into which an annular transponder unit has been incorporated pursuant to the invention.

Referring initially to FIG. 13 an annular transponder unit 132 is shown deployed within a tire 134. The tire 134 is formed from conventional materials such as rubber or rubber composites by conventional means and may comprise a radial ply or bias ply configuration. A typical tire 134 is configured having a tread 136, a shoulder 138, an annular sidewall 140, and a terminal bead 142. An inner liner 144 is formed and defines a tire cavity 146. The tire 136 is intended for mounted location upon an annular rim having a peripheral rim flange 150 extending to an outer rim flange surface 152. The rim is conventionally configured and composed of a suitably strong metal such as steel.

An annular antenna 154 is provided and may, but need not necessarily, embody a sinusoidal configuration. Antenna 154 may be alternatively configured into alternative patterns or comprise a straight wire(s) if desired and may be filament wire, or cord or stranded wire. Acceptable materials for the wire include steel, aluminum, copper or other electrically conducting wire. As mentioned previously, the wire diameter is not generally considered critical for operation as an antenna and multiple strands of fine wire is preferred. The curvilinear form of antenna 154 provides flexibility and minimizes the risk of breakage during manufacture and use explained below.

With continued reference to FIG. 13, a sensor housing 156 of preferably quadrilateral geometry is included in the transponder unit 132 and houses one or more sensors for sensing tire parameters such as pressure and temperature. Included as part of the apparatus 132 is a carrier strip of material 158 formed into the annular configuration shown. Carrier strip 158 is formed of electrically insulating, preferably semi-rigid elastomeric material common to industry such as rubber or plastic. The strip 158 is formed to substantially encapsulate at least a portion of the antenna wire(s) 154 and at least a portion of the sensor housing 156 to create a unitary annular assembly. In the post manufacturing state, therefore, the transponder unit 132 comprises antenna 154, sensor housing 156, and carrier strip 158, in a unitary, generally circular, semi-rigid assembly that is readily transportable and handled for attachment to tire 134. The diameter of the annular transponder unit 132 is a function of the size of the tire 134 to which it attaches as will be appreciated from the following.

Figure 1:
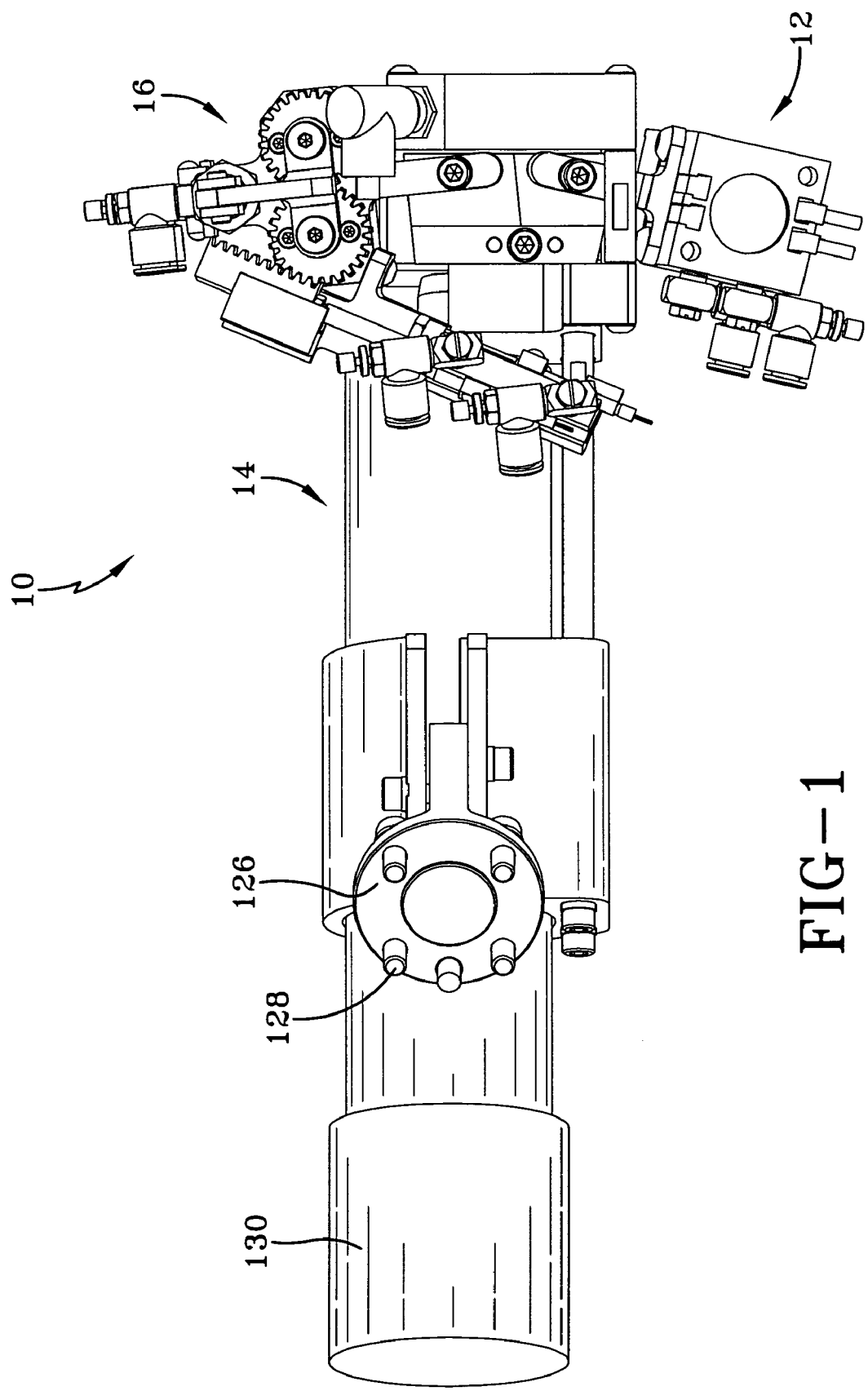
FIG. 1 is a top view of end-of-arm tooling assembly configured pursuant to the invention.
Figure 2:
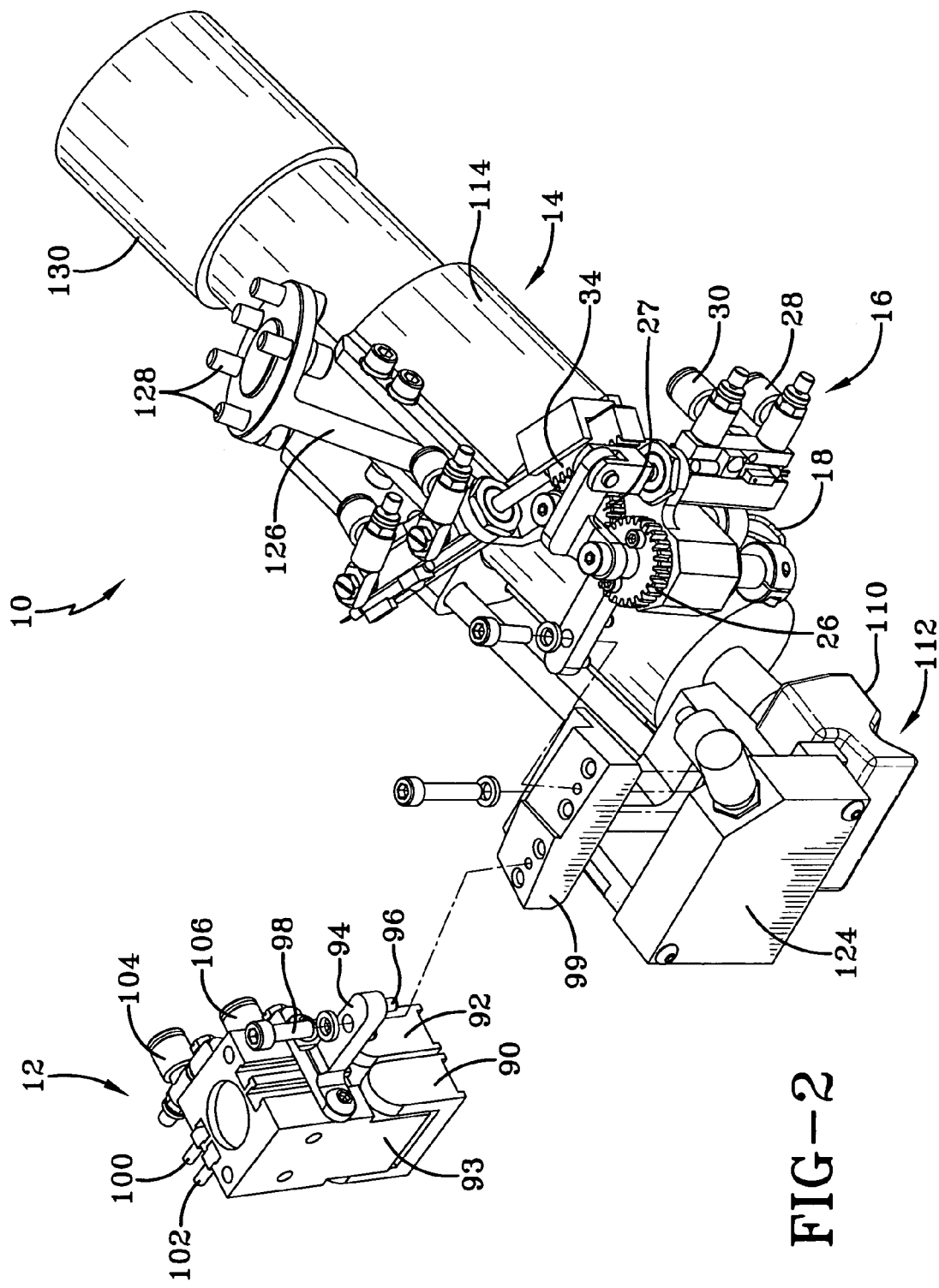
FIG. 2 is a partially exploded top perspective view thereof.

Referring to FIGS. 1 and 2, tooling 10 is disclosed for the attachment of an annular transponder unit to an annular tire inner surface. The tooling 10 generally comprises a gripper mechanism 12, an adhesive application mechanism 14, and a guide mechanism 16. While the mechanisms 12, 14, and 16 are arranged to function cooperatively in the attachment of an annular unit section by section to a tire, the principles of the invention will find utility in sundry other applications apparent to those skilled in the art where the objective consists of attachment of an annular apparatus to an annular surface.

Figure 3:
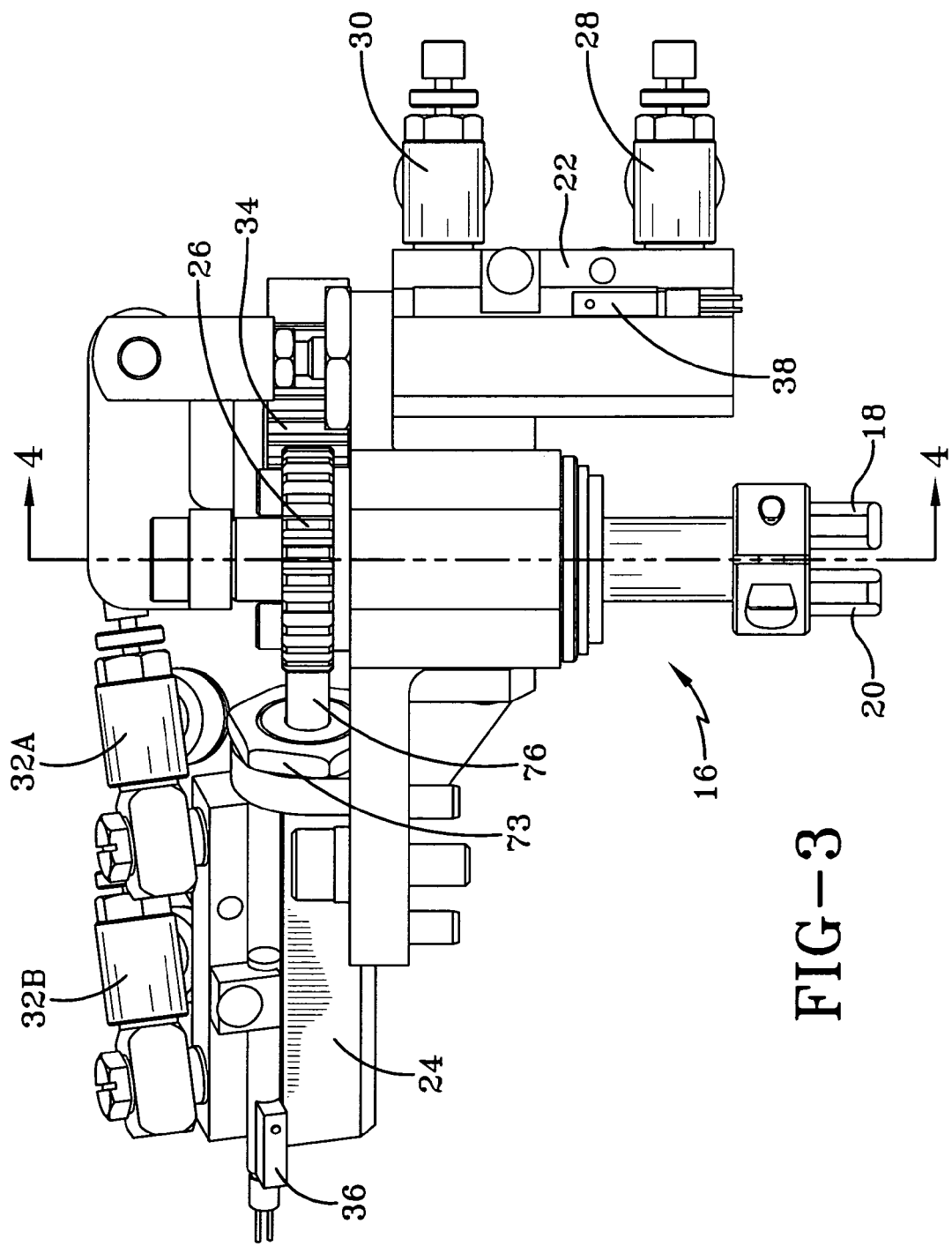
FIG. 3 is a side elevation view of the guide mechanism assembly.
Figure 4:
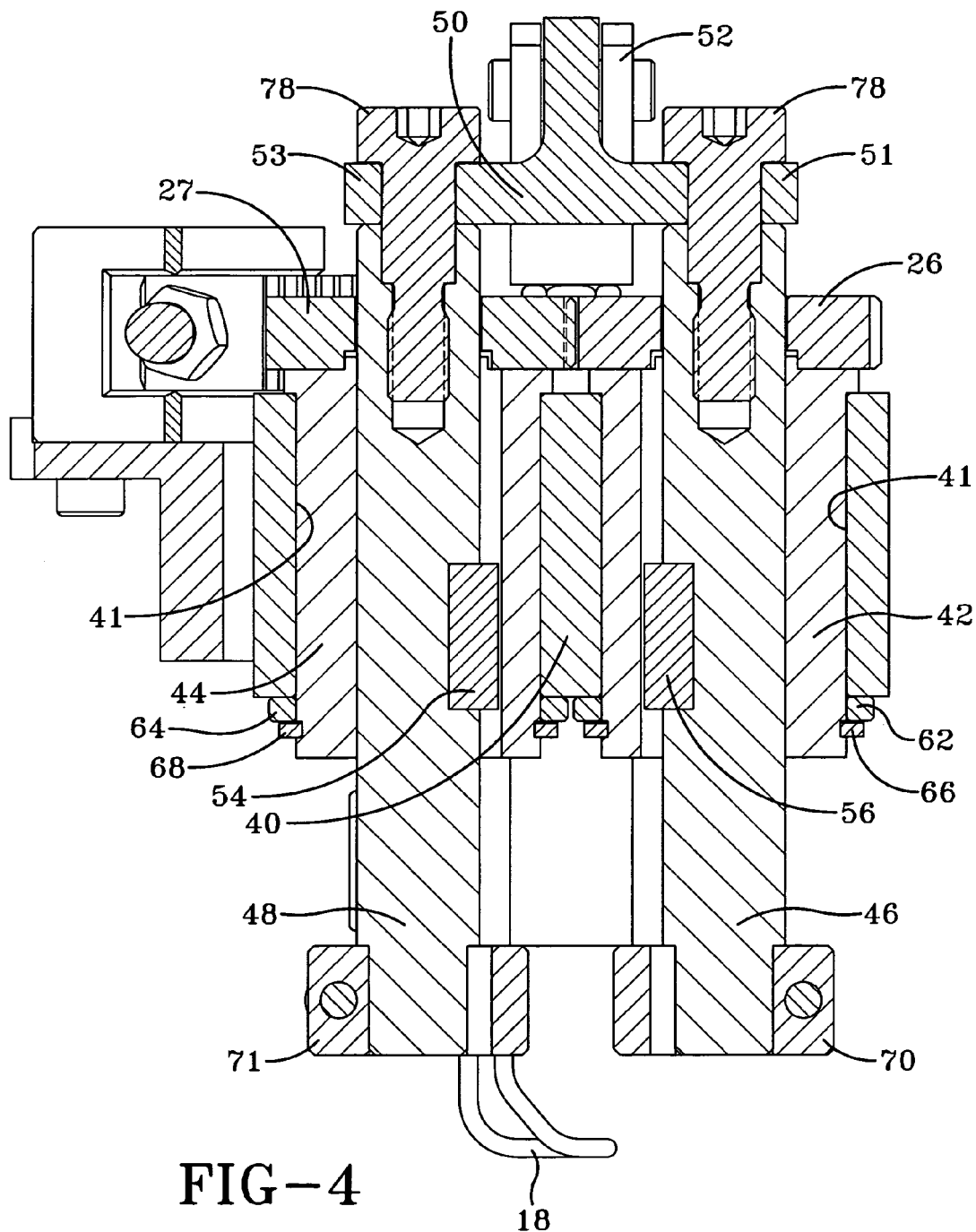
FIG. 4 is a transverse section view through the guide mechanism assembly of FIG. 3 taken along the line 4-4.
Figure 5:
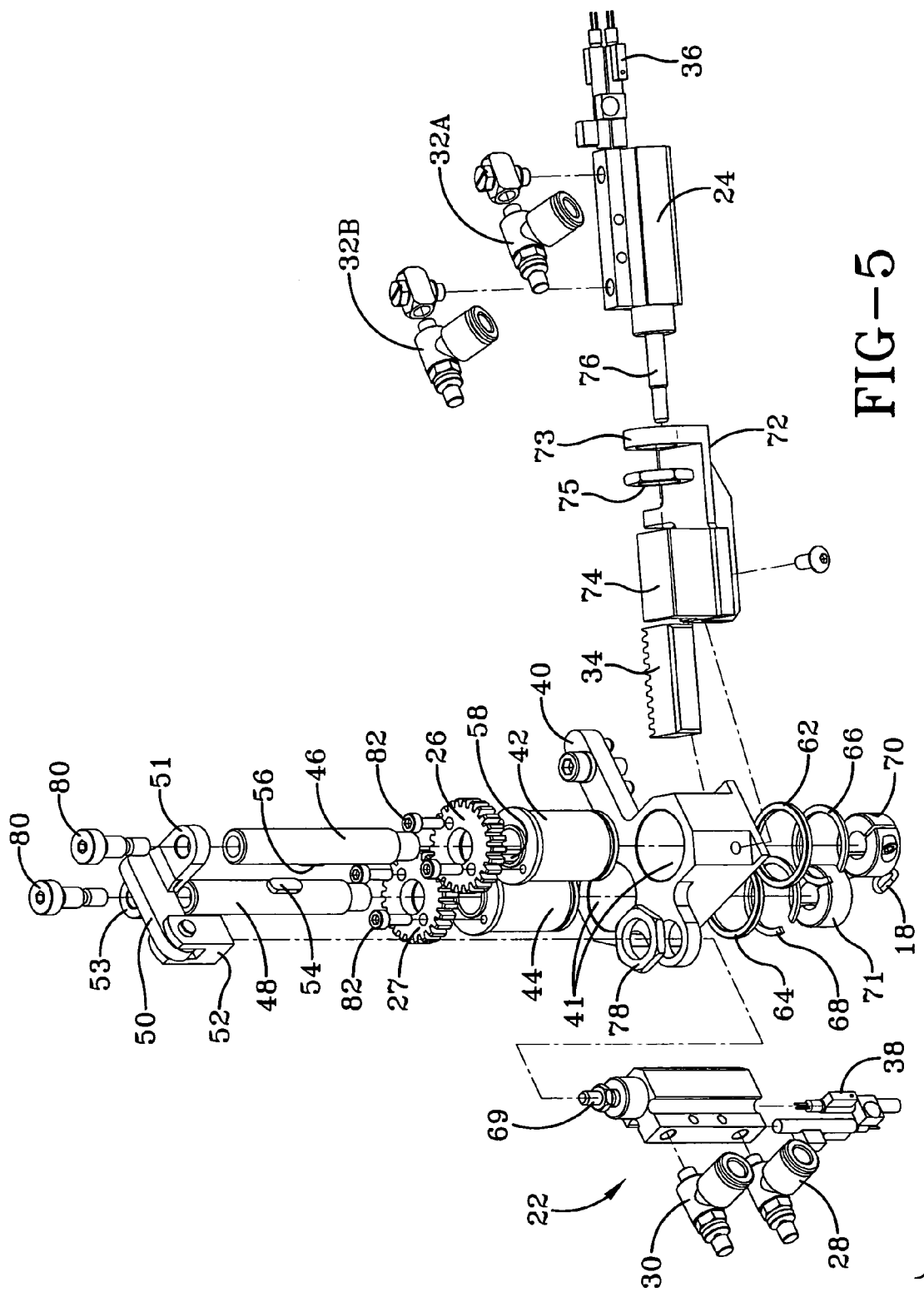
FIG. 5 is an exploded perspective view of the guide mechanism assembly.

With reference to FIGS. 3, 4, and 5, the guide mechanism 16 includes a pair of L-shaped guide fingers 18, 20 that pivot relative to one another between an open and a closed relationship. The fingers 18, 20 further may be raised and lowered between an operational elevation and a stand-by elevation as will be appreciated. The mechanism 16 includes a vertical lift cylinder 22 and a pivot cylinder 24 of a type commercially available for moving the fingers 18, 20 reciprocally along vertical and pivot paths, respectively. A pair of gears 26, 27 are disposed in adjacent relationship and operate to initiate and control pivotal movement of fingers 18, 20.

A pair of control valves 28, 30 control operation of the cylinder 22 and regulate the speed to which cylinder 22 effects vertical movement of the fingers 18, 20. A pair of control valves 32A and 32B similarly are mounted to the cylinder 24 and operate to regulate the speed and extent to which fingers 18, 20 pivot relative to one another. A rack 34 is coupled to the cylinder 24 and moves reciprocally along a linear path to engage gears 26, 27 and thereby effectuate and control pivotal movement thereof. A proximity switch 36 mounts to the valve 24 and indicates linear position of the cylinder 24 when an end-of-stroke condition is reached. Switch 38 likewise controls operation of cylinder 22 and functions to indicate vertical position of the assembly at the operative and stand-by elevations as will be appreciated.

With continued reference to FIGS. 3, 4, and 5, a housing block 40 is provided having a pair of adjacent through bores 41 extending therethrough. Sleeves 42, 44 are closely received within the bores 41 and the gears 26, 27 fixedly mount to the top of the sleeves 42, 44, respectively. Cylindrical shafts 46, 48 extend through the gears 26, 27 and sleeves 42, 44, respectively. An arm bracket 50 mounts over the assembly and includes a pair of lateral flanges 51, 53 that align with the axial bore extending through the shafts 46, 48. A clevis 52 is disposed at an outward end of the bracket 50. Each cylindrical shaft 46, 48 is provided with an outward projecting key protrusion 54, 56 that rides within a key slot 58, 60 extending axially along an inward surface of the sleeves 42, 44. As will be appreciated, the shafts 46, 48 reciprocally move within the sleeves 42, 44 as the key protrusions ride within their respective key slots.

A spacer ring 62, 64 mounts to the bottom of the block 40 in alignment with the bores 41 and retaining rings 66, 68 are mounted from the bottom against a respective spacer ring 62, 64. Finger clamps 70, 71 mount from the bottom. Each clamp 70, 71 has a through bore dimensioned to closely receive a lower end of a respective shaft 46, 48. As will be noted from FIG. 3, the guide fingers 18, 20 attach to a respective clamp 70, 71. Thus, the assembly of the guide mechanism 16 secures the guide fingers 18, 20 to bottom ends of the shafts 46, 48 which then alter the vertical position of the guide fingers along a reciprocal vertical path as the shafts 46, 48 move within the sleeves 42, 44. The lift cylinder 22 mounts to the block 40 as shown and includes a cylinder pin 69 that is coupled to the clevis 52. Accordingly, extension and retraction of the cylinder pin 69 actuates linear movement of the clevis 52 and thereby moves the shafts 46, 48 vertically within the sleeves 42, 44 to raise and lower the guide fingers 18, 20.

Continuing, the pivot cylinder assembly includes a mounting bracket 72 having a mounting flange 73 projecting outward therefrom. A U-shaped channel 74 extends forward along the bracket 72 and functions to stabilize the rack 34 as rack 34 moves along a linear path away from the bracket 72. The cylinder 24 includes a cylinder shaft 76 that protrudes through flange 73 and is coupled at a forward end to the rack 34. Reciprocal movement of shaft 76 effectuates reciprocal linear movement of the rack 34. As will be appreciated, the rack 34 is aligned to engage the gears 26, 27. Movement of the rack 34 along a linear path thus translates into a rotary movement of the gears 26, 27 which, in turn, rotate the sleeves 42, 44 and thereby impart rotational movement to the shafts 46, 48 within the sleeves 42, 44. Rotational movement of the shafts 46, 48 acts to rotate the guide fingers 18, 20 between a mutually opposed, closed position that defines a guide channel therebetween, illustrated in FIG. 3, and an open position. The valves 32A and 32B control the operation of valve 24 and the extent of linear movement is of rack 34 is indicated by operation of the proximity switch 36. The components described herein are commercially available to the industry.

The nut 75 attaches the cylinder 24 to flange 73. Similarly, nut 78 secures the vertical cylinder 22 to the block 40. Shoulder screws 80 extend through flanges 51, 53 of the arm bracket 50 and into the center bores of shafts 46, 48 to secure the arm bracket 50 to the shafts. Consequently, linear movement of the clevis 52 translates into a vertical movement of the shafts 46, 48 within the sleeves 42, 44. Additional assembly screws 82 (four being shown) may be used to secure the gears 26, 27 to the cylinders 42, 44 as described above.

Figure 6:
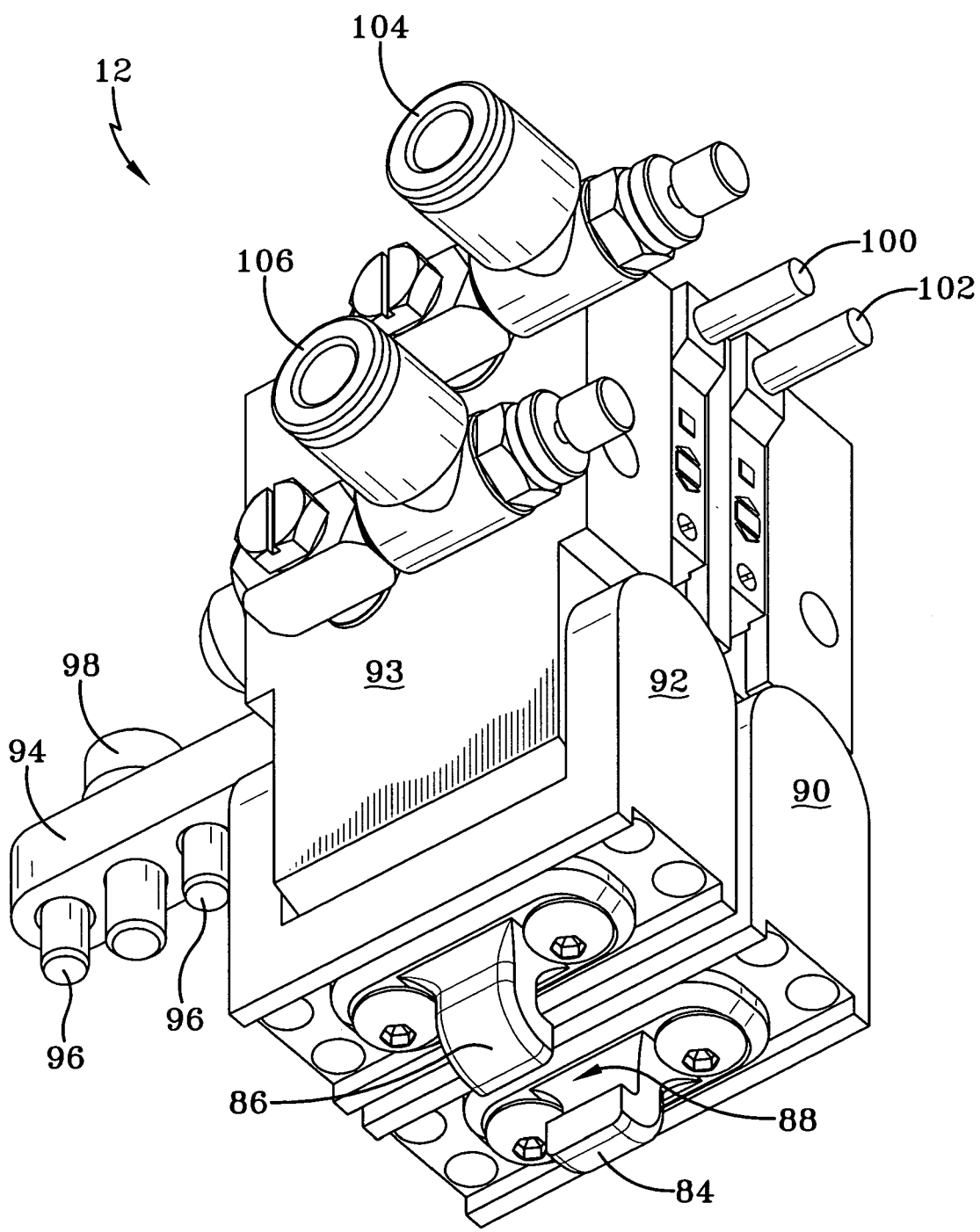
FIG. 6 is a bottom perspective view of the gripper mechanism assembly.

With reference to FIGS. 2 and 6, the gripper mechanism 12 includes opposed arcuate jaws 84, 86 fixedly mounted to an underside of adjacent pivot arms 90, 92, respectively. The pivot arms are U-shaped and are pivotally mounted within gripper block 93 such that the arms 90,92 swing from the mutually parallel ("closed") relationship shown in FIGS. 2 and 6 outward into divergent ("open") mutual relationship. In so doing, the jaws 84, 86 are carried between the closed position shown in FIGS. 2 and 6 into an open divergent position for a purpose explained below.

An integral arm 94 connects at one end to the body 93 and projects horizontally outward therefrom. Mounting pins 96 and screw 98 extend from the arm 94 to affix the mechanism 12 to the mounting bracket 99 shown in FIG. 2. Proximity switches 100, 102 are mounted to the body 93 and function to indicate the opening and closing of jaws 90, 92 as explained below. Control valves 104, 106 operatively connect to operate an actuation cylinder within the body 93 (not shown) whereby movement of the jaws 84, 86 between the open and closed positions is effected. The actuation cylinder, body, and controls described above are commercially available.

Figure 7:
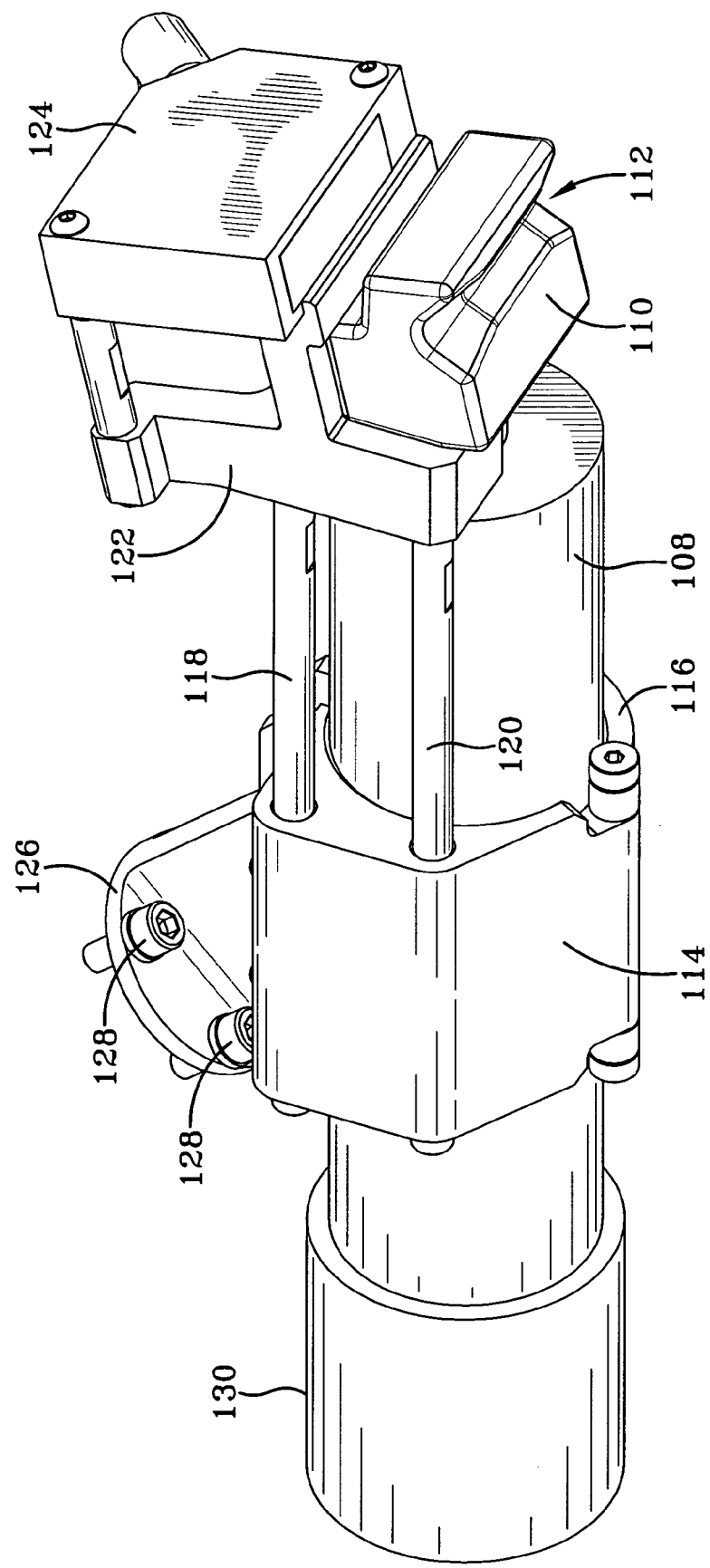
FIG. 7 is a left front perspective view of the adhesive applicator mechanism assembly.
Figure 9:
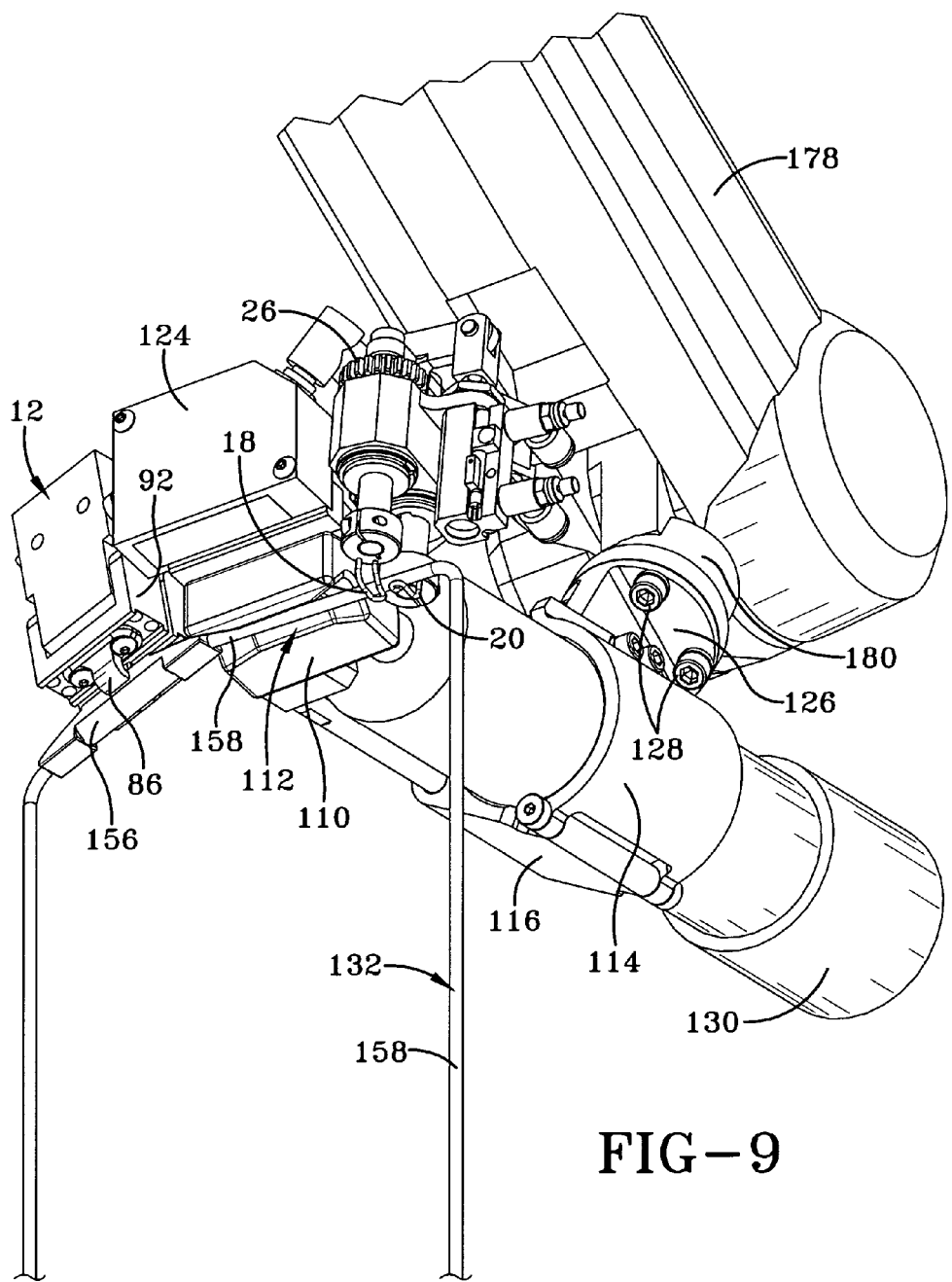
FIG. 9 is an enlarged perspective view of the end-of-arm tooling at the picking stage of the procedure, taken along the line 9-9 of FIG. 8.

Proceeding with regard to FIGS. 2, 7, and 9, the adhesive applicator mechanism 16 includes a pneumatic caulk gun 108 of a commercially available type. The gun 108 has a nozzle end 110 communicating with a transverse walled channel 112 of generally U-shaped cross-section. The gun 108 is housed between arcuate semi-circular shell housings 114, 116. Spaced apart support rods 118, 120 extend forward from the housings 114, 116 to bracket 122. A reflective laser displacement sensor unit 124, of a type commercially available, is disposed adjacent to the forward end of mechanism 16. An T-shaped mounting bracket 126 projects outward from the housings 114, 116 and includes attachment hardware in the form of screws 128 for attaching the mechanism 16 to the end of a robotic arm. The gun extends outward from a forward end to an outward portion 130.

Figure 8:
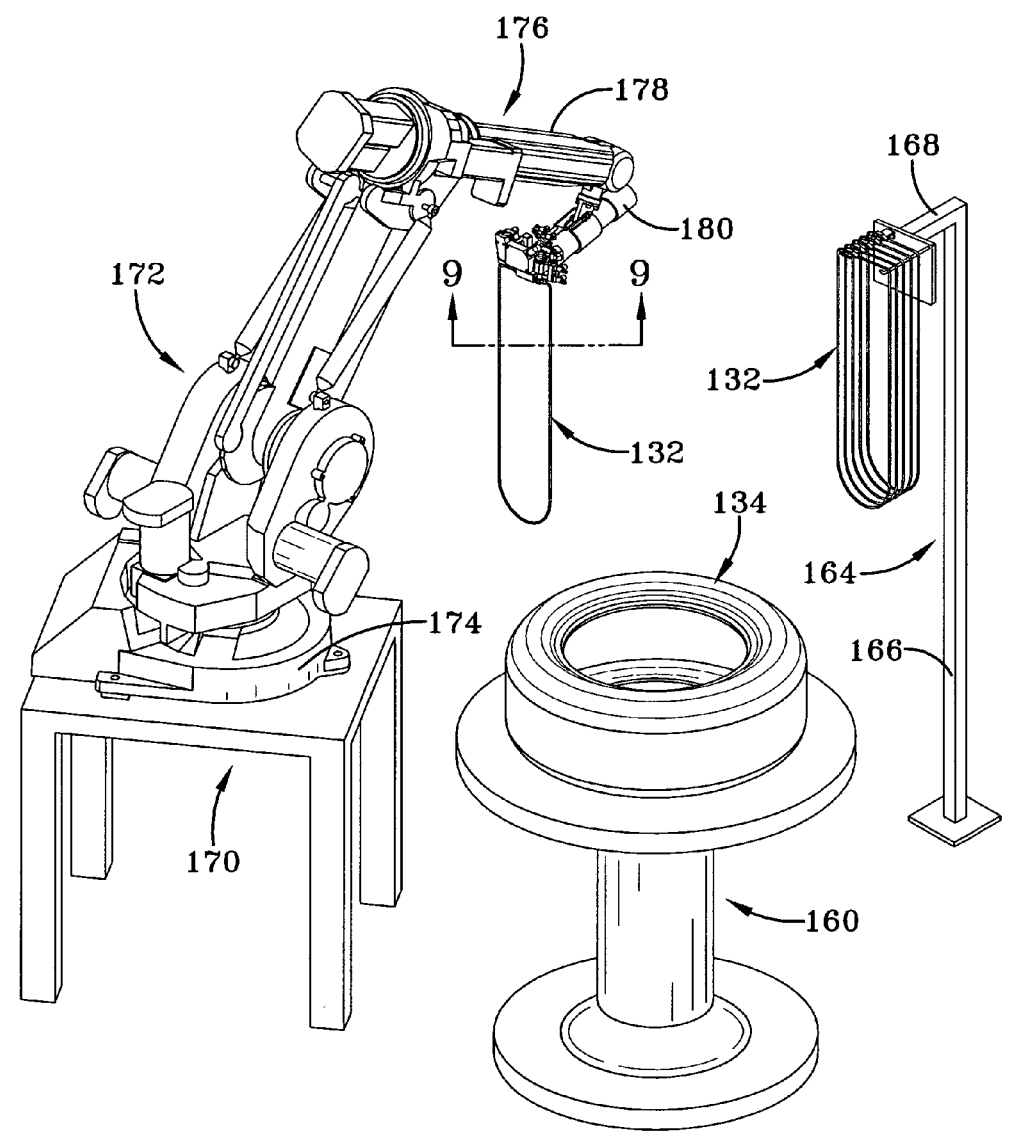
FIG. 8 is a perspective view of an annular transponder unit assembly station configured pursuant to the invention at a picking stage of the procedure.
Figure 10:
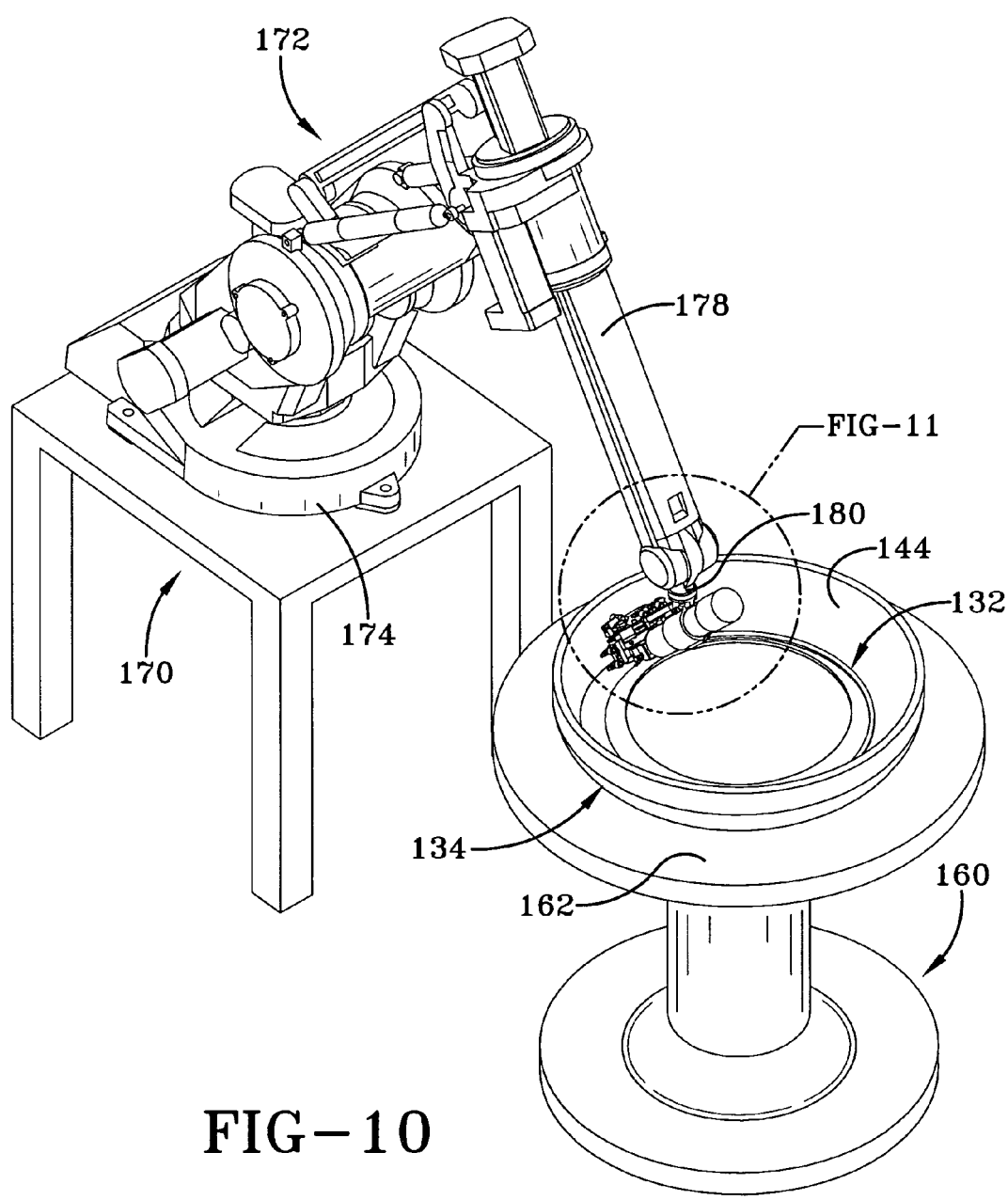
FIG. 10 is a perspective view of the annular transponder unit assembly station at an application stage of the procedure.

In FIGS. 8, 9, and 10, a depiction of a representative workstation system utilizing the subject end-of-arm tooling is shown. A turntable 160 having a top surface 162 rotates a tire 134 positioned thereon. A prestaging station 164 consists of a free standing stand 166 having an extended horizontal arm 168 configured to receive and suspend a plurality of pre-assembled annular transponder units 132 in side-by-side relationship. The stand 166 generally faces a robotic station comprising a support table 170. A pivoting robotic arm assembly 172, of a type commercially available, is pivotally mounted to the table 170 and swings an extending arm 176 between the prestaging station 164 and the tire supporting table 160. The arm 176 includes a pivotally coupled distal arm end segment 178 terminating at a remote end 180. The end-of-arm tooling 10 described previously mounts to the arm end 180 by T-bracket 126 as seen from FIG. 9. So suspended, the tooling 10 is reciprocally transported by arm segment 178 between the stations 160, 164.

Figure 11:
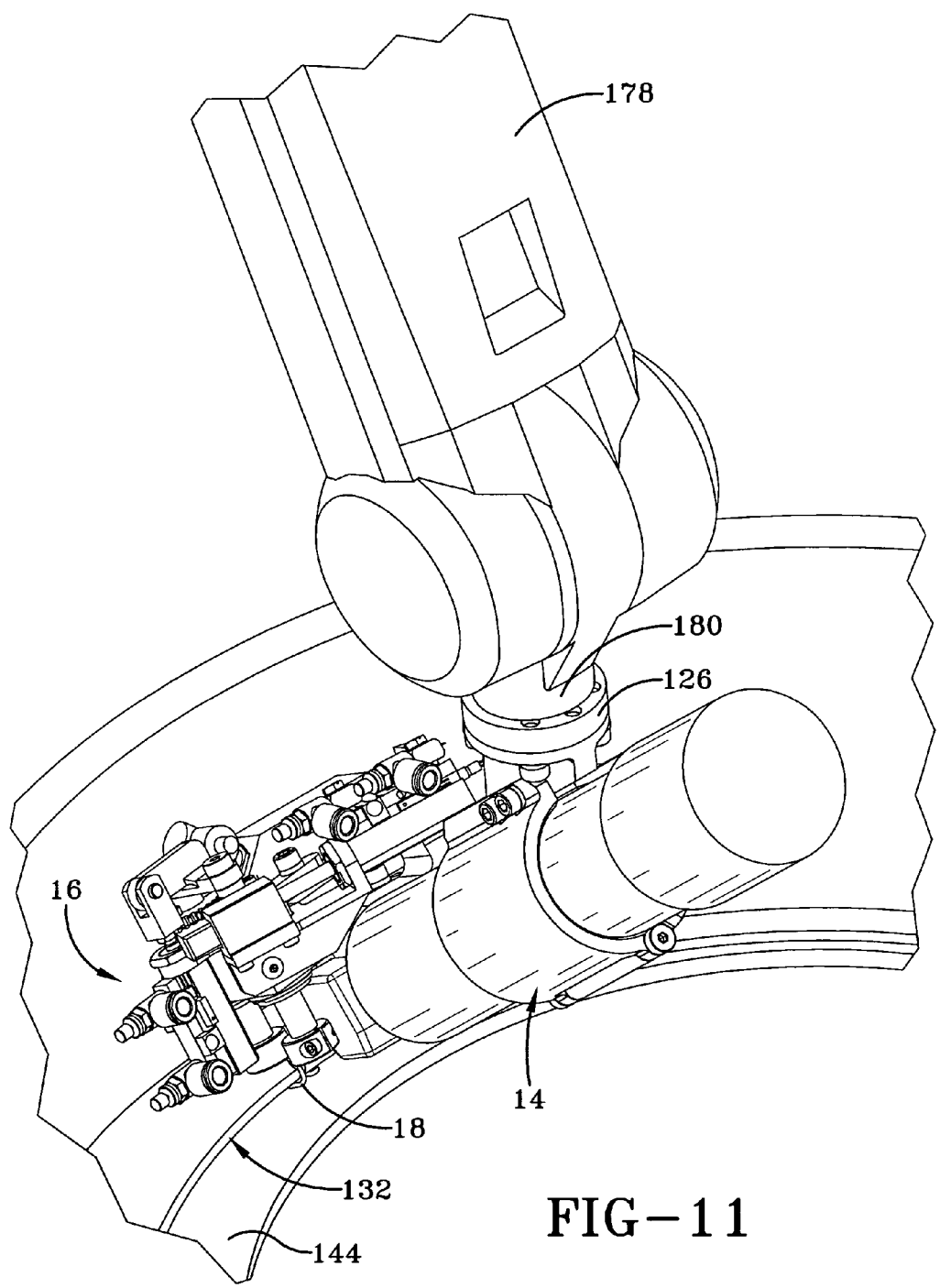
FIG. 11 is an enlarged perspective view of the end-of-arm tooling at the application stage of the procedure illustrating the portion designated as "FIG. 11" in FIG. 10.
Figure 12:
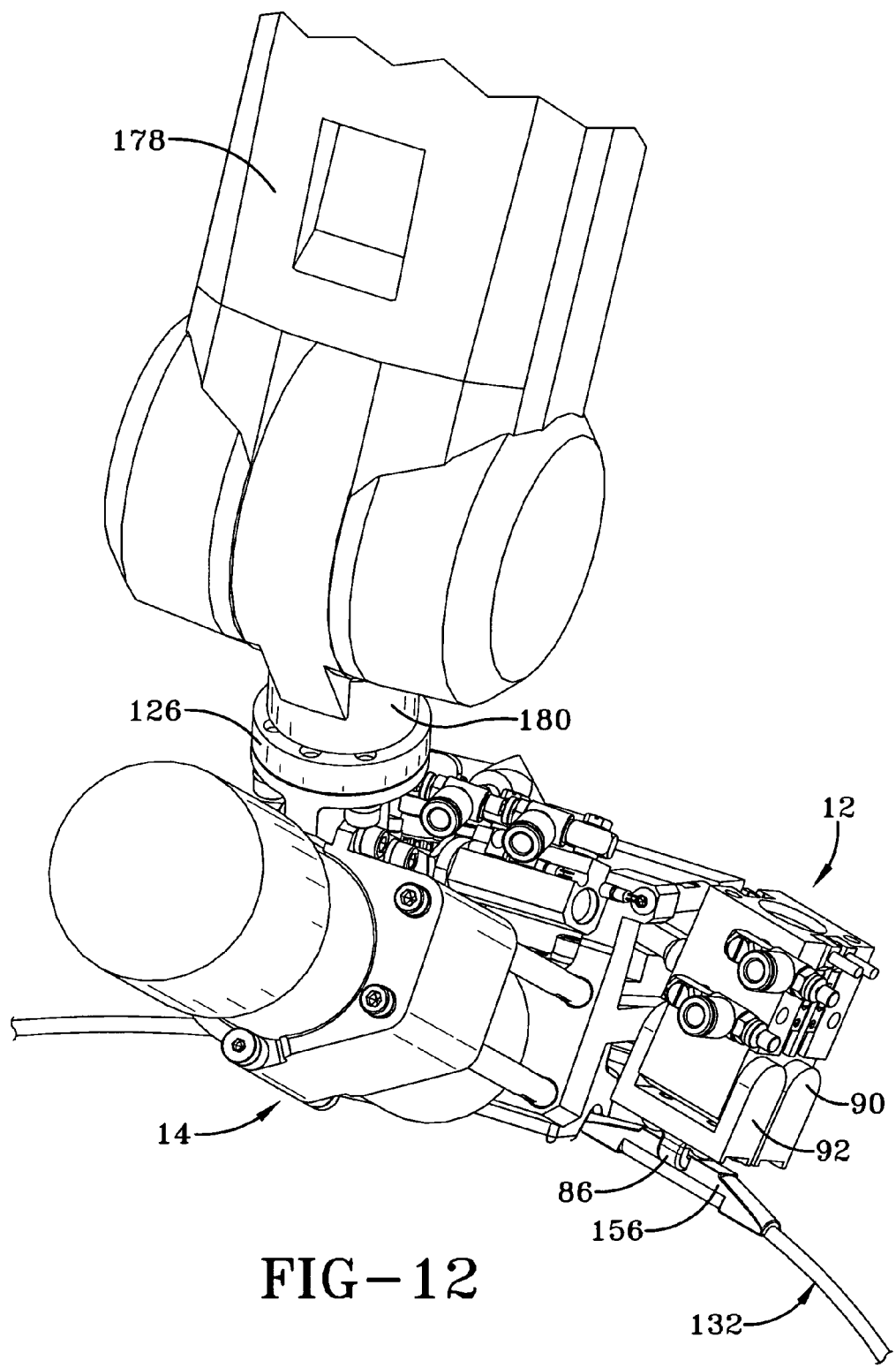
FIG. 12 is an enlarged perspective view of the end-of-arm tooling at the beginning of the application stage.

The relative disposition of the gripper mechanism 12, adhesive application system 14, and the guide mechanism 16 will be appreciated from FIGS. 11 and 12. In general, the component systems 12, 14, and 16 are arranged serially and in-line with the gripper mechanism 12 leading, the adhesive application system 14 in the middle, and the guide mechanism 16 trailing. The adhesive nozzle end 130 is connected to an adhesive pumping system that supplies on demand an adhesive of known type such as industrial glue or epoxy. The three basic modules, systems 12, 14, and 16 are fixedly attached to the end-of-arm 180 and will function for tires of varying sizes. While the specific mechanisms 12, 14, and 16 are described above, the invention is not intended to be limited to the apparatus shown and described. Other mechanisms that operate to place and apply an annular apparatus against and annular surface through section-by-section placement is within the contemplation of the invention.

The modules 12, 14, and 16 are attached to the arm of a commercially available robot in the embodiment shown. One suitable robot is the ABB model IRB 1400 manufactured and sold by ABB Inc., 501 Merritt 7, Norwalk, Conn., 06851. The robot may be programmed for annular ring diameter, tire annular surface angle, and contact height. The turntable 160 further includes a chuck and a hold-down mechanism (not shown) of a conventional, commercially available configuration to hold the tire 134 in a fixed position on surface 162. The tire chuck centers and secures the tire to the turntable.

In operation, one or more annular transponder units are disposed adjacent to the turntable 160, preferably but not necessarily on the support stand 164 shown and described above. Multiple annular transponder units may be positioned along arm 168 of the stand and sequentially picked off the arm. The orientation of each annular transponder unit on the arm 168 is such to facilitate access by the end-of-arm tooling 10 to the sensor housing 156 of the next available annular transponder unit.

The robot arm 178 extends into contact with the interior of the tire 134 and applies a small patch of adhesive through the nozzle 110, creating an indexed location for subsequent positioning of an annular transponder unit. The adhesive patch is placed preferably but not necessarily at the radial location of the hold down mechanism of the tire chuck. The robot arm 178 then comes out of the tire and moves to the pre-staging fixture 164. The end-of-arm tooling moves over the transponder unit and the gripper mechanism arms 90, 92 pivoted into an open position. The jaws 84,86 grip the sensor housing 156 as the arms pivot into a closed position, while the guide fingers 18, 20 of the guide mechanism 16 close around the flexible antenna section adjacent the housing 156. The two wire fingers 18, 20 thus create a channel therebetween that loosely engages the antenna strip 158. With the gripper mechanism 12 and guide mechanism 16 engaged at their respective portions of the transponder unit, the section of antenna 154 that is between the guide mechanism and the gripper mechanism is held in the center of the nozzle channel 112.

The robot arm 172 then takes the transponder unit from the pre-staging fixture 164 and places it in the interior of the tire 134 on turntable surface 162. The base of the sensor housing 156 is pressed into the previously applied adhesive patch in the tire, radially in line with the hold-down mechanism of the tire chuck. The gripper mechanism 12 is then opened, the jaws 84, 86 pivoting outward. The hold-down mechanism 192 enters the interior of the tire and contacts the top surface of the sensor housing 156.

Thereafter the turntable 162 is rotated as adhesive is pumped through the nozzle 110, surrounding and adhering the transponder antenna to the tire interior annular surface. As the turntable rotates, the incoming antenna section is guided into the nozzle channel 112 as it is pulled through the guide fingers 18, 20. The guide fingers 18, 20 keep the antenna at a proper height relative to the tire surface to insure proper adhesion. The hold-down mechanism keeps the transponder sensor housing 156 relatively fixed to the tire as it rotates. This prevents the drag of the antenna through the nozzle 110 and guide fingers from dislodging the transponder sensor housing from its original position in the tire.

One representative mechanism by which the tire is held in position upon the turntable and the transponder is held as the tire rotates and the antenna is affixed to the tire is shown in FIGS. 14-19. In general, the mechanism is provided to temporarily hold one section of a ring component in place (preferably but not necessarily the transponder package), on the inside surface of the tire, while the tire is rotated in order to complete the installation of the ring component. During the installation of the flexible ring component, the tire is placed on the horizontal rotary turntable. As part of the larger operation previously described, the flexible ring component is installed on the lower inside surface of the tire and adhesive is applied to the entire circumference of the ring, causing the ring to be bonded to the tire. In its final position the ring is in a circular shape and is co-axial with the center of rotation of the tire. The ring is located preferably but not necessarily about 10 millimeters from the top of the wheel rim flange.

As described previously, to install the ring, the transponder housing of the ring is held by the robotic arm and brought into contact with a small patch of adhesive previously applied to the tire. The robotic arm then releases the transponder and a fixing mechanism moves into position and comes into contact with the flexible portion of the ring component that is pulled section by section through a guide. As the flexible portion of the ring passes through the guide adhesive is continuously injected on and around the ring, securing it to the tire. The fixing mechanism makes lateral contact with the tag portion of the ring so that the ring can not move radially relative to the tire. This prevents the ring from being dislocated due to the friction of the flexible portion of the ring passing through the guide.

The turntable centering mechanism incorporates a plurality of centering fixtures 182A, B, C, D, each comprising an elongate finger 186 A,B,C,D, respectively, each finger having an end cap portion 184 A,B,C,D, respectively. A vertical positive stop 190 extends from each finger 186 and serves to keep each finger at a preset distance from the turntable upper surface 162. The fingers 186 are arranged in a circular pattern and each moves radially within an opening 188 A,B,C,D from the center of the turntable 160. The fingers 186 are operated by any common conventional linkage (not shown) to move reciprocally in the radial direction to ensure that the fingers are at the same radius from the center of the turntable 160 at all times. The tire 134 is placed on the turntable 160 and the finger linkage is then operated so that all the fingers 186 make contact with the inside diameter of the tire at the lower bead area. After the fingers have moved out radially and make radial contact with the tire bead, the fingers are then actuated vertically downward so that the caps 184 on each finger 186 make contact with the top surface of the bottom bead. The vertical motion of each finger is also limited by an adjustable positive stop 190, so that the final height of all the caps is at a common height. Each stop 190 is extended from a respective finger 186 by a horizontal support arm 191. The fingers and caps serve to secure the tire to the turntable, to center the tire coaxially with the center of the turntable, and also slightly pull down the lower bead area of the tire so that the entire top surface of the lower bead area is in a single plane at a fixed distance from the top surface of the turntable. The subject centering method is preferred but other known fixturing techniques and apparatus may be employed alternatively within the practice of the invention if desired.

Figure 14:
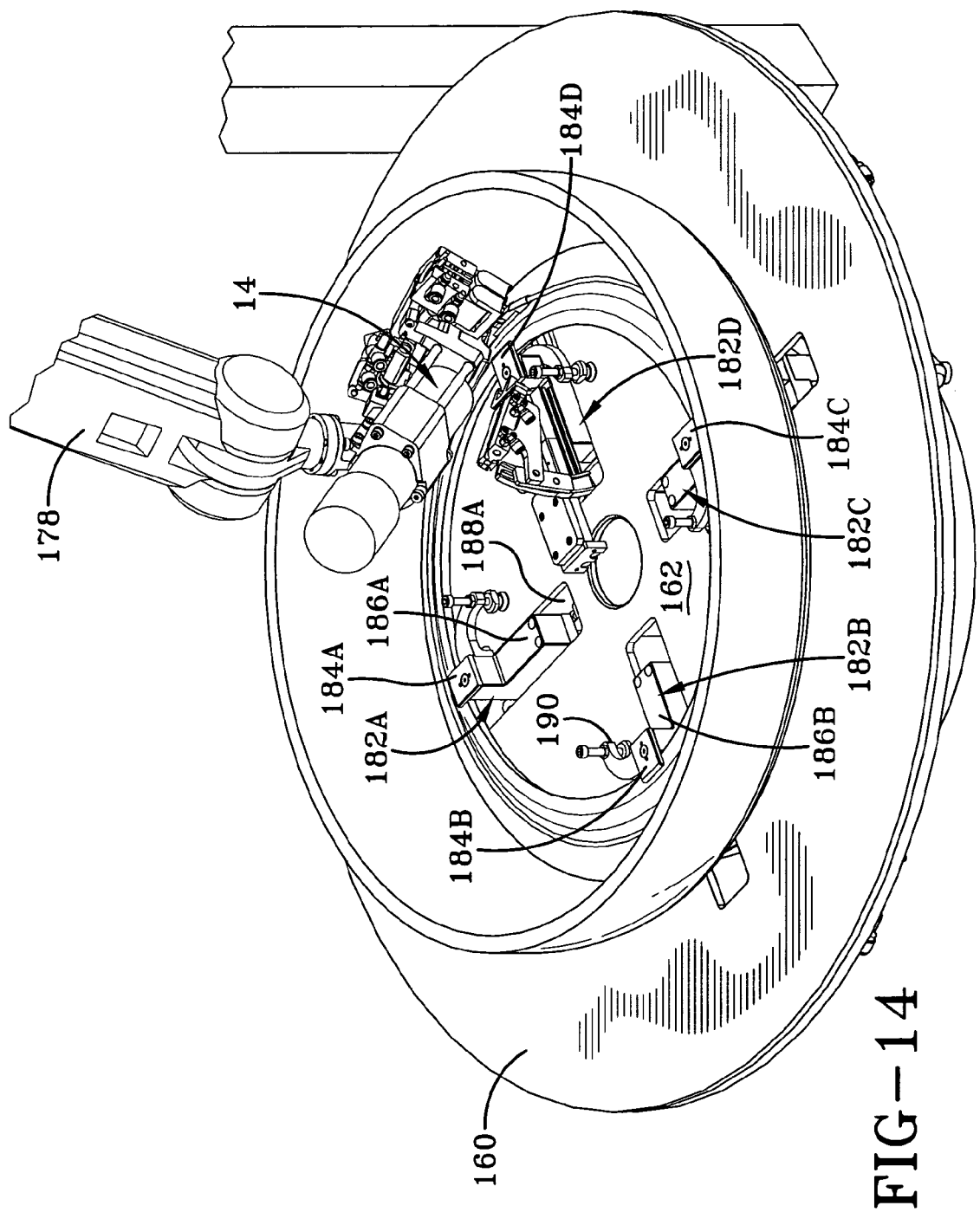
FIG. 14 is a top perspective view of a tire centering and clamp down device.
Figure 15:
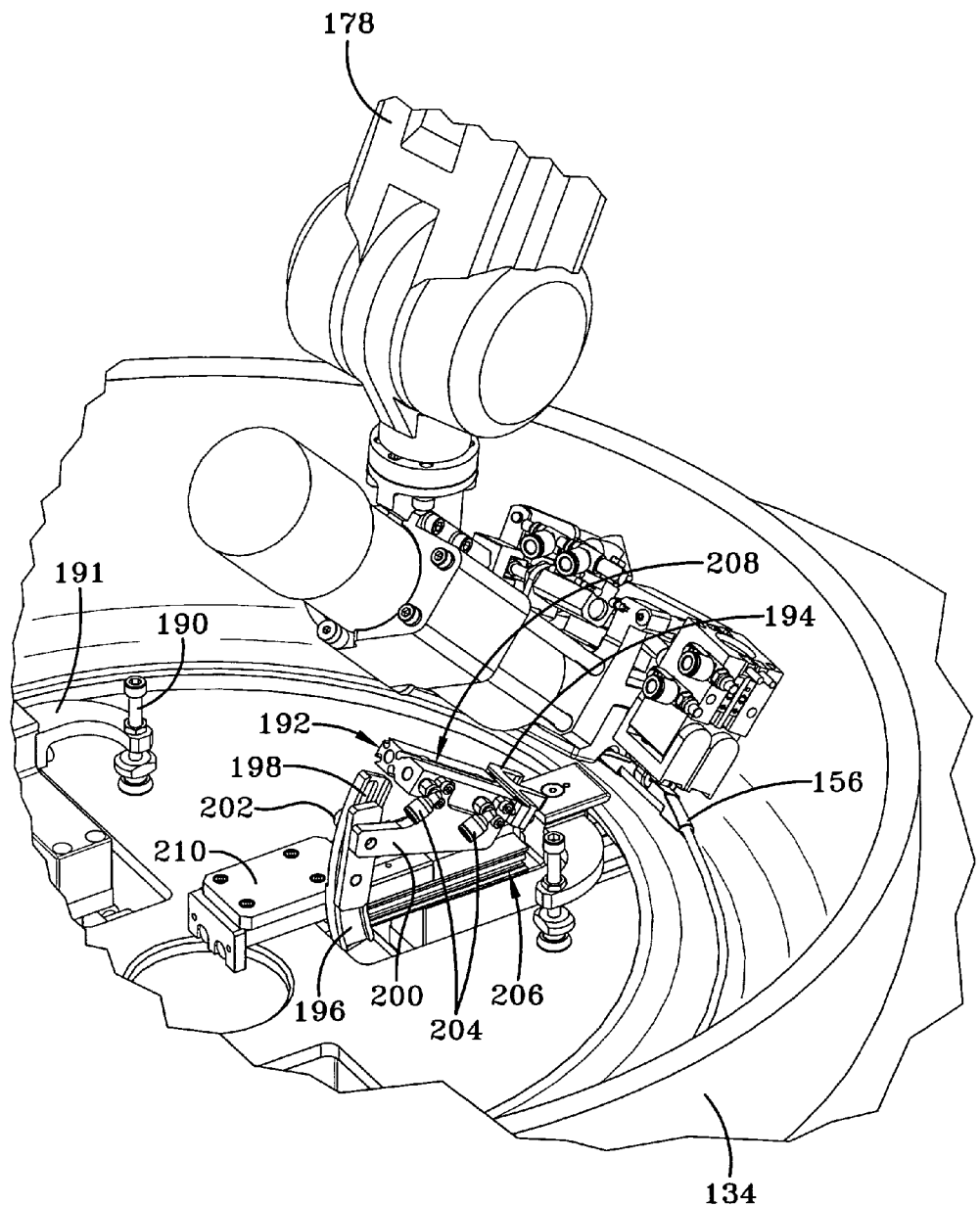
FIG. 15 is a detailed view of the transponder clamp down mechanism of FIG. 14.

With respect to FIGS. 14 and 15, the fixing mechanism 192 is mounted to one of the fingers 186D. The fixing mechanism 192 moves radially and vertically with the finger to which it is mounted. For any given tire 134, the tag or transponder 156 is placed at a known position and orientation relative to the lower bead of the tire. Since the finger makes positive contact with the lower bead area of the tire, the desired final position of the tag is known relative to the geometry of the finger 186.

A fixing mechanism 192 is provided for attachment to the turntable and provides means for fixing a predetermined portion of the annular ring (such as, but not necessarily, the transponder housing) to a position on the tire and holding the predetermined ring portion in place as the tire is rotated on the turntable. The mechanism 192 includes a retainer end 194 represented in the form of a fork. Other alternatively shaped retaining ends may be deployed if required or desired for a particular application. The mechanism 192 further includes an arcuate bracket arm 196 radially inwardly disposed that includes an arcuate slot 198. Mounting bracket 200 attaches to the slot 198 and is adjustable into alternative angled positions and held in such position by a set screw 202. A pneumatic fittings 204 are provided and apply actuation pressure to a pneumatic linear cylinder with linear guides 206 that moves the yoke 204 along a reciprocal linear path radially outward. An angled pneumatic actuator 208 is mounted to the bracket 200 and coupled to the arcuate arm 196. The angled actuator 208 carries the fork 194 along an angled path to into a retention relationship with the transponder housing 156 wherein the fork 194 straddles the housing 156 to inhibit lateral movement thereof. A slide table 210 is used to support the pneumatic actuators 206, 208 and is mounted to the turntable by suitable hardware as shown. The actuators 206 and 208 and associate table 210 are of a type commercially available as an assembly such as in the Air Slide Table Series MKS manufactured by SMC Corp., having a business location at 3011 N. Franklin Rd., Indianapolis, Ind. 46226.

The fixing mechanism 192 thus as will be appreciated from above therefore may, but need not necessarily for the practice of the invention, include two axes of motion. Mechanisms that use a single actuation path to bring a retention device into a retaining relationship with an annular ring portion are intended to be within the scope of the invention. In a two axis system, of the type .depicted, a first axis is a horizontal linear axis, parallel to the surface of the turntable 160 and in the direction of motion of the finger to which it is attached. The second axis is in the plane of motion of the finger but at an acute angle to the turntable surface. Each motion is operated by its own pneumatic actuator 206,208. The horizontal actuator 206 operates along a linear path and is interchangeably referred to herein as the "linear actuator". The linear actuator 206 is mounted to the finger 186D. The angled actuator 208 is mounted to the horizontal actuator 206 by the bracket 200 which can be manually adjusted to change the angle of operation. The adjustment bracket is designed to provide a center of rotation about a point a known distance from the "toe" of the bottom bead area of the tire.

In operation, the bracket 200 is adjusted so that the angle of actuation is approximately parallel to a cross-section through the tire in the area of the transponder. The fork fixture 194 is attached to the outside moving portion of the angular actuator 208. The fork 194 is designed to fit over a rectangular protrusion on the transponder housing 156 so that the fork makes close contact with the lateral face of the rectangular protrusion. This contact prevents the tag and ring from moving laterally relative to the tire during the installation of the ring.

Figure 16:
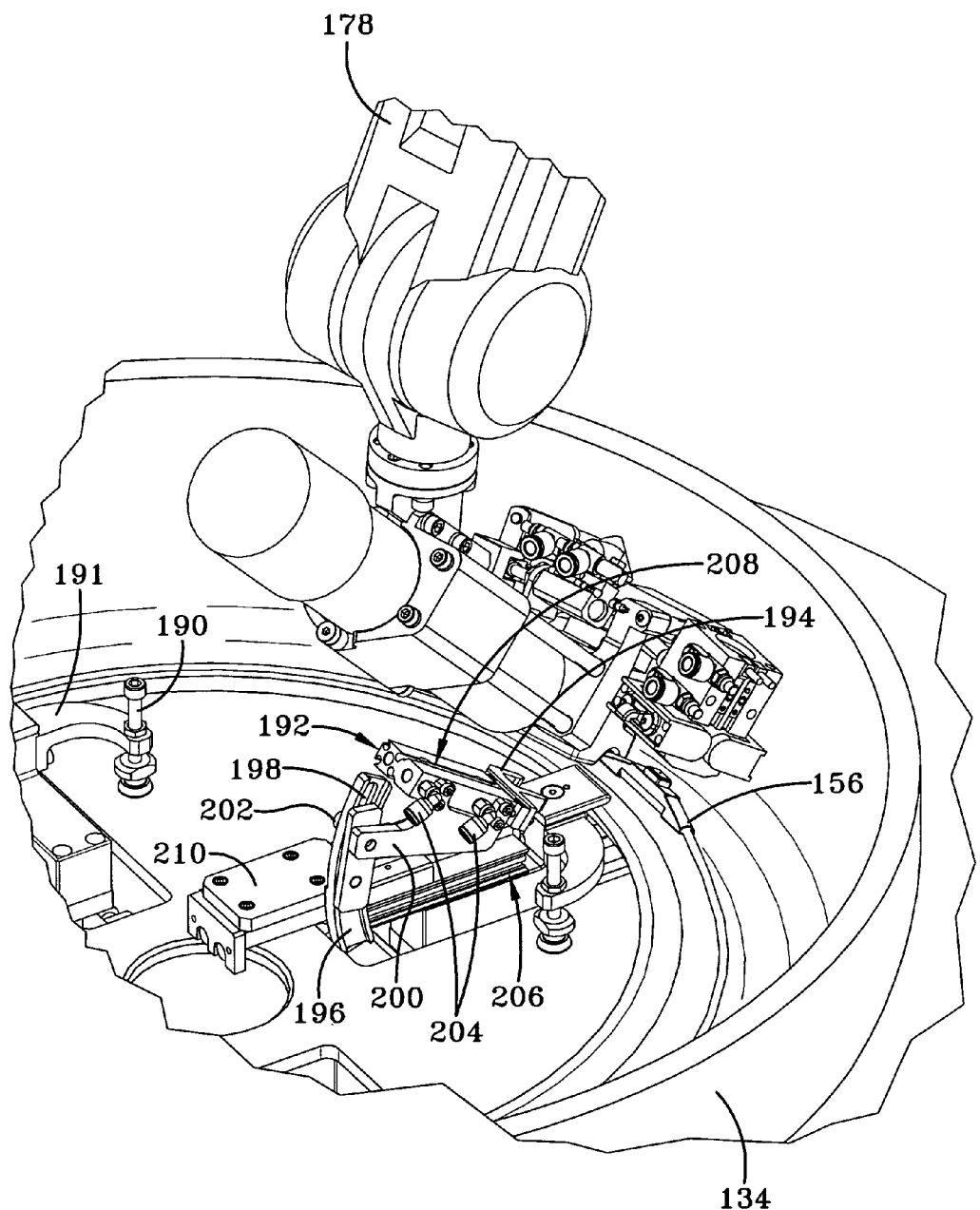
FIG. 16 is a top perspective view of the clamp down mechanism shown with the clamping fingers in the open position.

In operation, the horizontal and angled actuators 206, 208 are initially in the retracted position, so no portion of the mechanism protrudes beyond the contact surface of the finger. The tire 134 is placed on the turntable top 162 and the finger linkage (not shown) operated so that all the fingers 186 move radially outward and stop against the lower bead of the tire. Thereafter the fingers are all operated vertically downward so the lower bead is held in a fixed plane a known distance from the turntable. The robot arm tooling is brought into the inside cavity of the tire in the area where the transponder is desired to be placed. The location of the transponder is defined to be in the same angular "clock" position as the finger on which the fixing mechanism 192 is attached. A small patch of adhesive is injected through the robot arm tooling as described on the tire in the area where the transponder will be placed. The robot arm then moves out of the tire and picks up an annular assembly 132, gripping and supporting the annular unit at the transponder housing. The robot returns to the inside of the tire and presses the tag into the adhesive patch (See FIGS. 14 and 15). The gripper on the robot arm then opens to release the transponder (FIG. 16).

Figure 17:
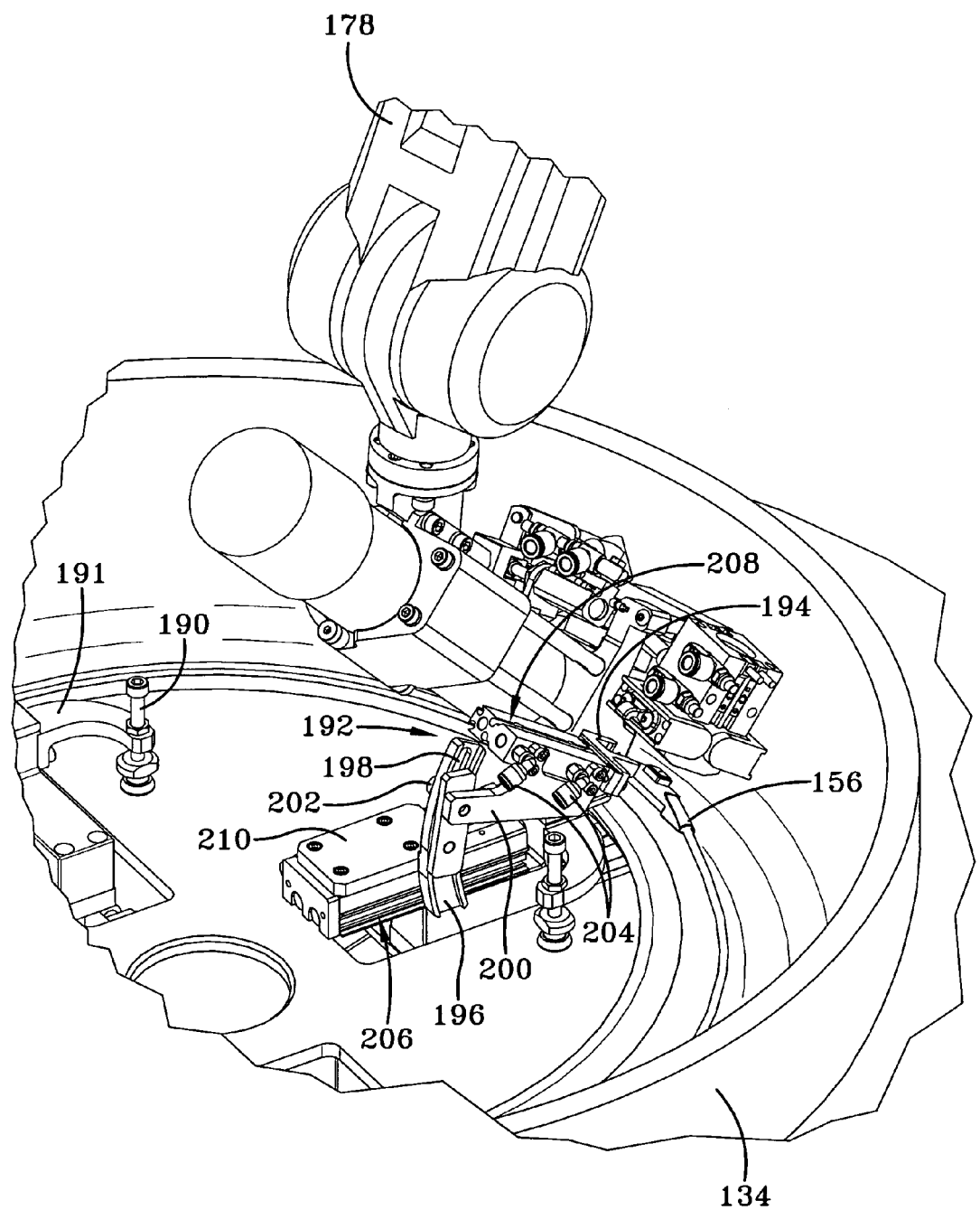
FIG. 17 is a top perspective view of the clamp down mechanism showing the horizontal actuator moved in to position the yoke mechanism.
Figure 18:
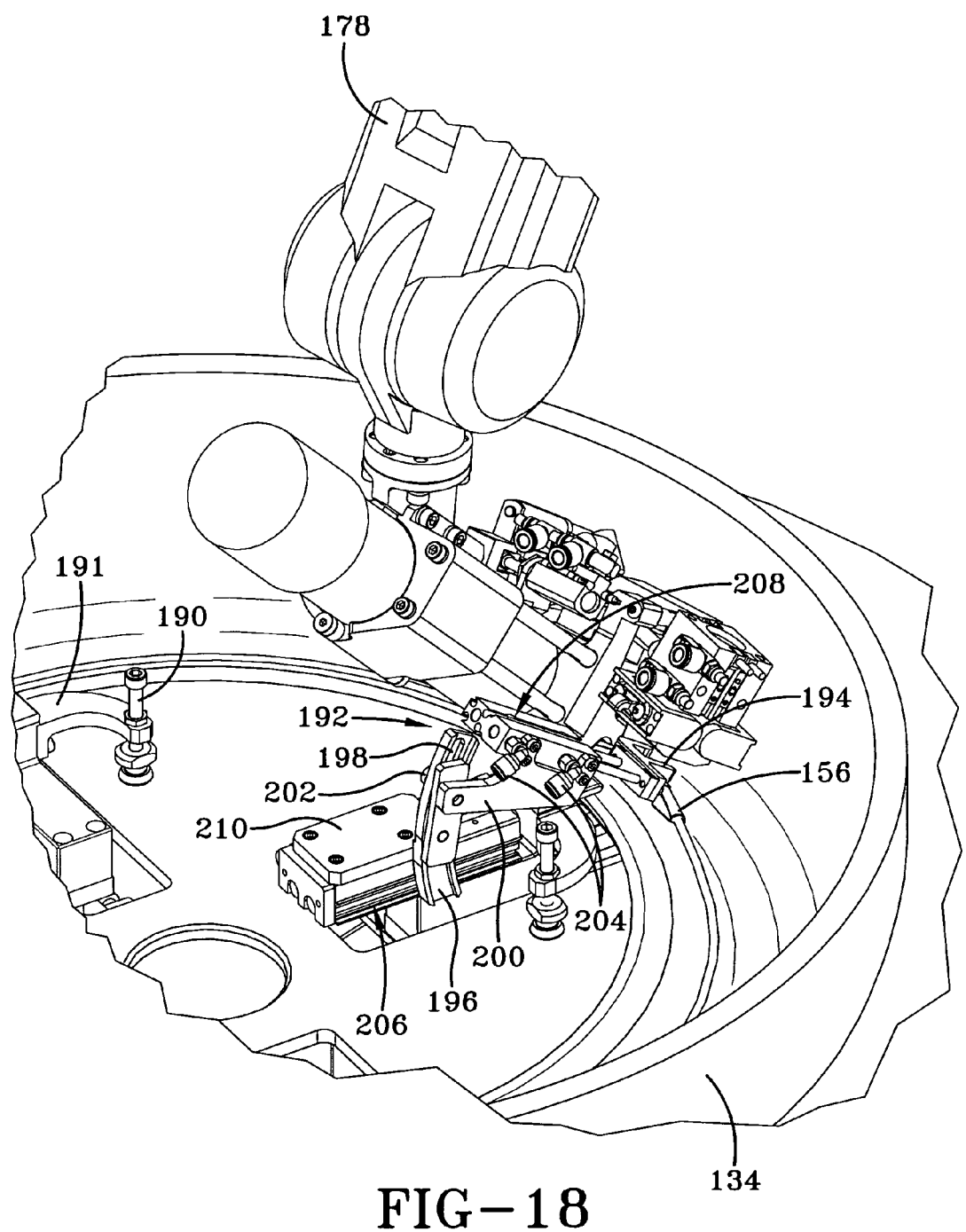
FIG. 18 is a top perspective view of the angled actuator moved in to position the yoke into a straddling relationship to the transponder.
Figure 19:
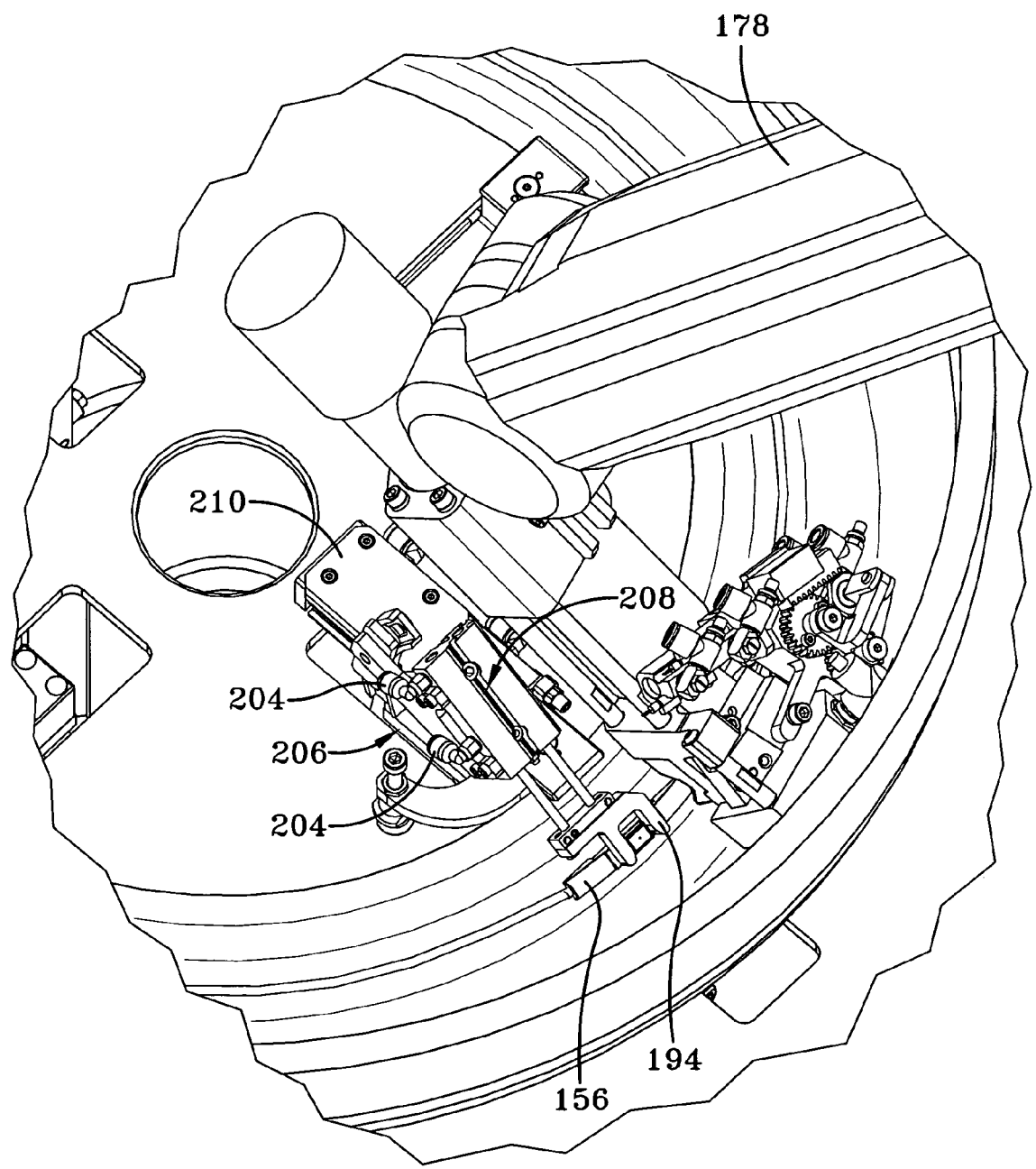
FIG. 19 is an enlarged top perspective view of the clamping mechanism showing the yoke in a straddling relationship to the transponder.

Thereafter, the horizontal actuator 206 on the fixing mechanism 192 is pneumatically actuated to move the mechanism radially outward (FIG. 17). The angular actuator 208 is then operated to bring the fork into close bridging relationship with the transponder housing (FIGS. 18 and 19). The turntable is rotated while adhesive is injected on and around the carrier strip 158. The fork 194 remains in a retention position with the transponder housing 156 for almost the full revolution of the tire. After a certain degree of rotation has been completed, there is enough adhesive bonding between the carrier strip 158 and the tire 134 that the friction between the carrier strip and the guide cannot cause the strip to move relative to the tire. At this point in the rotation, the angular actuator is retracted, taking the fork out of retention engagement with the transponder housing 156. The linear actuator is also retracted at this time. The tire containing the annular assembly unit 132 is then removed from the turntable and the system is ready to accept another tire.

From the foregoing, it will be appreciated that the subject invention achieves an efficient and reliable connection between an annular assembly and an annular surface. The invention can find application where the attachment of an annular ring to an annular surface is desired, particularly in the attachment of a sensor unit to a tire. The mechanism repeatedly secures the tire to a rotating turntable and effects an initial attachment of the transponder to the tire surface. The mechanism 192 serves to maintain the transponder against the tire while the annular unit is adhered section by section to the tire. Mechanism 192 positively and automatically maintains the transponder in place against the tire at a reference location without imparting damage to the sensor unit.

While the preferred embodiment described above envisions a rotation of the tire 134 on the turntable 160 while the end of arm tooling 10 and hold down mechanism 192 function as intended, it is within the contemplation of the invention that the tire may be maintained stationary on a table surface while the end of arm tooling 10 is configured to rotate within the tire. In the alternative configuration, a relative rotational movement of the end of arm tooling and the tire is achieved through rotation of the arm tooling rather than the tire. In some applications, the tire and the tooling may both move relative to one another. As used herein, the term "rotation" is not intended to mandate a complete revolution. In some applications for non-closed antenna configurations, a partial revolution may suffice to attach the transponder and antenna unit to a tire.

Likewise, while preferred, the antenna and transponder need not be a fully enclosed circular configuration. The invention may find application in the attachment of an elongate antenna (i.e. not necessarily circular or annular) to an elongate tire surface. The initial attachment of the transponder, the operation of the fixing mechanism, the section by section attachment of the antenna by the end-of-arm tooling would accordingly proceed as described above. Therefore, in use of the term "elongate" in reference to the antenna, it is intended that the term may cover enclosed circular configurations as well as other elongate geometries.

While the preferred embodiment described above envisions a rotation of the tire 134 on the turntable 160 while the end of arm tooling 10 and hold down mechanism 192 function as intended, it is within the contemplation of the invention that the tire may be maintained stationary on a table surface while the end of arm tooling 10 is configured to rotate within the tire. In the alternative configuration, a relative rotational movement of the end of arm tooling and the tire is achieved through rotation of the arm tooling rather than the tire. In all other respects, the mechanism and apparatus function as described previously to effect a section by section application of the annular apparatus against a target annular surface of the tire.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. Apparatus for attaching an elongate transponder unit to an elongate tire surface, the transponder unit being of a type having a transponder housing coupled to an elongate antenna, the apparatus comprising:
   a) a table for supporting a tire so as to render the elongate tire surface accessible;
   b) an arm proximately disposed to the turntable and having tooling means at a remote end for progressively attaching the elongate antenna section by section to the elongate tire surface; and
   c) means for establishing a relative movement between the tire and the arm tooling means between an initial relative position and a terminal relative position.

2. Apparatus according to claim 1, further comprising means for rotating the table relative to the arm tooling means.

3. Apparatus according to claim 1, wherein the tooling means comprises:
   gripping means engaging the transponder housing for placing the transponder housing at an indexed location on the elongate tire surface;
   guide means engaging the elongate antenna for progressively positioning the elongate antenna section by section along the elongate tire surface; and
   an adhesive applicator nozzle disposed between the guide means and the gripping means for progressive application of an adhesive material between sections of the elongate antenna and the elongate tire surface.

4. Apparatus according to claim 3, further comprising means for disengaging the gripping means from the sensor housing prior to initiating relative movement between the tire and the arm tooling means.

5. Apparatus according to claim 3, further comprising means for disengaging the guide means from the elongate antenna as the tire and arm tooling means substantially reach the terminal relative position.

6. Apparatus according to claim 3, wherein the guide means comprises at least two pivotal gripping fingers receiving the elongate antenna therebetween and maintaining the elongate antenna in a preferred position relative to the elongate tire surface.

7. Apparatus according to claim 6, wherein the gripping fingers rotate from a closed condition into an open condition prior to encountering the transponder housing.

8. Apparatus according to claim 1, wherein further comprising a remote pre-staging station supporting the transponder unit, the arm remote end moving between the pre-staging station and the table to transport the transponder unit to the tire on the table.

9. A method for attaching an elongate transponder unit to an elongate tire surface, the transponder unit being of a type having a transponder housing coupled to an elongate antenna, the method comprising the steps:
   a) mounting a tire on a support table, the tire having an elongate tire surface accessibly disposed;
   b) positioning an arm proximate to the support table, the arm having tooling means at a remote end;
   c) supporting a section of the transponder unit against the elongate tire surface by the arm tooling means;
   d) establishing relative movement between the arm tooling means and the tire between an initial relative position and a terminal relative position; and
   e) progressively attaching the transponder antenna section by section to the elongate tire surface as the tire and arm tooling means relatively move.

10. A method according to claim 9, comprising the step of establishing relative rotation between the arm tooling means and the tire by rotation of the table supporting the tire.

11. A method according to claim 9, further comprising the steps:
   gripping the sensor housing by gripping means disposed at the remote end of the arm;
   holding the sensor housing against an indexed location on the elongate tire surface;
   guiding the elongate antenna against the elongate tire surface section by section by guide means apparatus disposed at the remote end of the arm; and
   progressively applying an adhesive material section by section between the elongate antenna and the elongate tire surface as a relative rotation between the apparatus at the remote end of the arm is effected.

12. A method according to claim 11, further comprising the steps:
   disengaging the gripping means from the sensor housing as the tire approaches the terminal relative position; and
   applying the adhesive material to a final section of the transponder unit as the tire reaches the terminal relative position.

13. A method according to claim 12, further comprising the step of guiding the antenna section by section through an adhesive applicator nozzle as the tire rotates.

14. A tire having an elongate transponder unit attached to an elongate tire surface thereof, the transponder unit being of a type having a transponder housing coupled to an elongate antenna, and the transponder unit attachment to the tire being formed by the steps:
   a) mounting the tire on a support table;
   b) positioning an arm proximate to the support table, the arm having tooling means at a remote end;
   c) supporting a section of the transponder unit against the elongate tire surface by the arm tooling means;
   d) establishing relative movement between the arm tooling means and the tire between an initial relative position and a terminal relative position; and
   e) progressively attaching the transponder antenna section by section to the elongate tire surface as a relative motion between the tire and the arm tooling means is effected.

15. A tire according to claim 14, the transponder unit attachment to the tire being formed by the further step of establishing relative rotation between the arm tooling means and the tire by rotation of the table supporting the tire.

16. A tire according to claim 14, the transponder unit attachment to the tire being formed by the further steps:
   gripping the sensor housing by gripping means disposed at the remote end of the arm;
   placing the sensor housing against an indexed location on the elongate tire surface;
   guiding the elongate antenna against the elongate tire surface section by section by guide means apparatus disposed at the remote end of the arm; and
   progressively applying an adhesive material section by section between the elongate antenna and the elongate tire surface.

17. Apparatus for attaching an elongate transponder unit to an elongate tire surface, the transponder unit being of a type having a transponder housing coupled to an elongate antenna, the apparatus comprising:
   a) a rotary turntable for supportably rotating a tire having an elongate tire surface in an accessible disposition;
   b) an arm proximately disposed to the turntable and having substantially end-of-arm tooling for supporting and attaching the transponder unit section by section to the elongate tire surface as a relative rotation between the tire and the end-of-arm tooling is effected for substantially one revolution.

18. Apparatus according to claim 17, wherein the tooling comprises:
   a gripping mechanism engaging the sensor housing and placing the transponder housing at a preselected location on the elongate tire surface;
   a guide mechanism engaging the elongate antenna and positioning the elongate antenna section by section along the elongate tire surface.

19. Apparatus according to claim 18, further comprising an adhesive material applicator nozzle disposed between the guide mechanism and the gripping means for application of the adhesive material between the elongate antenna and the elongate tire surface.

20. Apparatus according to claim 18, further comprising a pre-staging station supporting the transponder unit, the arm moving between the pre-staging station and the turntable and the gripping mechanism engaging the sensor housing at the pre-staging station to transport of the transponder unit from the pre-staging station to the turntable.

* * * * *